(12) United States Patent
Leutfeld et al.

(10) Patent No.: US 10,377,906 B2
(45) Date of Patent: Aug. 13, 2019

(54) COMPOSITION FOR RHEOLOGY CONTROL

(71) Applicants: Daniela Leutfeld, Wesel (DE); Marc Eberhardt, Wesel (DE); René Nagelsdiek, Hamminkeln (DE); Sylvia Bühne, Duisburg (DE); Jürgen Omeis, Dorsten-Lembeck (DE); Jasmin Rudner, Dinslaken (DE)

(72) Inventors: Daniela Leutfeld, Wesel (DE); Marc Eberhardt, Wesel (DE); René Nagelsdiek, Hamminkeln (DE); Sylvia Bühne, Duisburg (DE); Jürgen Omeis, Dorsten-Lembeck (DE); Jasmin Rudner, Dinslaken (DE)

(73) Assignee: BYK-Chemie GmbH, Wesel (DE)

( * ) Notice: Subject to any disclaimer, the term of this patent is extended or adjusted under 35 U.S.C. 154(b) by 0 days.

(21) Appl. No.: 15/304,028

(22) PCT Filed: Feb. 11, 2015

(86) PCT No.: PCT/EP2015/000300
§ 371 (c)(1),
(2) Date: Oct. 13, 2016

(87) PCT Pub. No.: WO2015/158407
PCT Pub. Date: Oct. 22, 2015

(65) Prior Publication Data
US 2017/0044378 A1   Feb. 16, 2017
US 2017/0240748 A9   Aug. 24, 2017

(30) Foreign Application Priority Data

Apr. 15, 2014 (EP) .................... 14001367

(51) Int. Cl.
| | | |
|---|---|---|
| *C09D 123/00* | (2006.01) | |
| *C09D 5/04* | (2006.01) | |
| *C09D 7/63* | (2018.01) | |
| *C08K 5/20* | (2006.01) | |
| *C08K 5/21* | (2006.01) | |

(52) U.S. Cl.
CPC ................ *C09D 5/04* (2013.01); *C09D 7/63* (2018.01); *C08K 5/20* (2013.01); *C08K 5/21* (2013.01)

(58) Field of Classification Search
None
See application file for complete search history.

(56) References Cited

U.S. PATENT DOCUMENTS

| | | |
|---|---|---|
| 3,388,100 A | 6/1968 | Thoma et al. |
| 3,471,449 A | 10/1969 | Heydkamp et al. |
| 3,682,861 A | 8/1972 | Radlmann et al. |
| 3,856,830 A | 12/1974 | Kuehn |
| 3,953,381 A * | 4/1976 | Remond ............ C11D 3/32 252/194 |
| 4,019,972 A | 4/1977 | Faust |
| 4,089,835 A | 5/1978 | König et al. |
| 4,206,109 A | 6/1980 | Reischl et al. |
| 4,314,924 A | 2/1982 | Haubennestel et al. |
| 4,383,068 A | 5/1983 | Brandt |
| 4,579,899 A | 4/1986 | Kondo |
| 4,870,151 A | 9/1989 | Scholl et al. |
| 5,349,011 A | 9/1994 | Reichert et al. |
| 5,399,294 A | 3/1995 | Quednau |
| 5,410,008 A | 4/1995 | Bauer |
| 5,446,200 A | 8/1995 | Bordin |
| 5,597,942 A | 1/1997 | Pohl et al. |
| 5,753,731 A | 5/1998 | Yoshioka et al. |
| 6,420,466 B1 | 7/2002 | Haubennestel et al. |
| 6,686,412 B1 | 2/2004 | Berschel et al. |
| 7,632,882 B2 | 12/2009 | Lenges et al. |
| 7,655,815 B2 | 2/2010 | Haubennestel et al. |
| 8,362,300 B2 | 1/2013 | Pritschins et al. |
| 9,458,332 B2 * | 10/2016 | Leutfeld ............ C09D 5/04 |
| 2007/0225451 A1 | 9/2007 | Haubennestel et al. |
| 2012/0289635 A1 | 11/2012 | Bühne et al. |

FOREIGN PATENT DOCUMENTS

| | | |
|---|---|---|
| CA | 2352660 C | 10/2008 |
| DE | 2 359 923 A1 | 6/1974 |
| DE | 28 22 908 B1 | 7/1979 |
| EP | 0 006 252 A1 | 1/1980 |
| EP | 0 528 363 A2 | 2/1993 |
| EP | 1 048 681 A2 | 11/2000 |
| EP | 1 188 779 A1 | 3/2002 |
| EP | 1 593 700 A1 | 11/2005 |
| EP | 1 832 573 A2 | 9/2007 |
| GB | 1 230 605 | 5/1971 |
| GB | 2 177 411 A | 1/1987 |

(Continued)

OTHER PUBLICATIONS

PCT/EP2015/000300—International Search Report, dated Apr. 24, 2015. English Translation.
PCT/EP2015/000300—Written Opinion of the International Searching Authority, dated Apr. 24, 2015. English Translation.
PCT/EP2015/000300—International Preliminary Report on Patentability, dated Oct. 18, 2016. English Translation.
PCT/EP2010/000505—Written Opinion of the International Searching Authority, dated Sep. 20, 2010.

(Continued)

*Primary Examiner* — Yun Qian

(74) *Attorney, Agent, or Firm* — Cumtolo Sidoti Co., LPA; Joseph G. Curatolo; Salvatore A. Sidoti

(57) ABSTRACT

The invention relates to a rheology control agent containing i) 15-95% by weight of an amide compound (A), ii) 5-75% by weight of a urea compound (B), iii) 0-50% by weight of an ionogenic compound (C) and iv) 0-35% weight of an organic solvent (D).

22 Claims, No Drawings

(56) References Cited

FOREIGN PATENT DOCUMENTS

| | | |
|---|---|---|
| JP | 2011 079887 A | 9/1974 |
| JP | S49 99981 A | 9/1974 |
| JP | 2002020682 | 1/2002 |
| JP | 2002542367 | 12/2002 |
| JP | 2008297544 | 12/2008 |
| WO | WO 2011/091812 A1 | 8/2011 |

OTHER PUBLICATIONS

PCT/EP2010/000505—International Search Report, dated Sep. 20, 2010.
PCT/EP2010/000505—International Preliminary Report on Patentability, dated Feb. 2, 2012.
Office Action in Japanese Application No. 2016-562891, dated Dec. 25, 2017.

\* cited by examiner

COMPOSITION FOR RHEOLOGY CONTROL

CROSS REFERENCE TO RELATED APPLICATIONS

This application is a national stage application of International Application No. PCT/EP2015/00300, filed 11 Feb. 2015, which claims priority from European Patent Application No. 14001367.3, filed 15 Apr. 2014, which applications are incorporated herein by reference.

The present invention relates to a composition and also to the use thereof and to a preparation comprising the composition.

To control the rheology of liquid systems, especially liquid coating systems, rheological aids used are, primarily, organically modified bentonites, silicas, hydrogenated castor oil, and polyamide waxes.

A disadvantage of using these rheological aids is that they are usually present in the form of dry solids. Consequently, said rheological aids before being used are therefore destructurized to form an intermediate product, using solvents and shearing forces. Alternatively, before being destructurized, the rheological aids may also be used by being introduced into the liquid coating system by targeted temperature control. Where this temperature control does not take place in accordance with the specified targets, crystallites typically appear in the finished coating system, and can lead to defects in the coating.

A general disadvantage of using these rheological aids is that they give rise to clouding and haze in clear, transparent coatings. Moreover, handling dry, pulverulent products which may give rise to dusts during processing is undesirable.

A liquid application alternative to these solid rheology control agents is represented by solutions of specific urea compounds. Solutions of this kind are frequently used in practice and are described for example in EP-A-1 188 779. Serving as solvent and/or carrier medium typically are polar/aprotic solvents and/or ionic liquids, which are de facto salt melts which are liquid under moderate temperature conditions (usually below 80° C., ideally at room temperature). The rheology control properties of dissolved urea compounds are usually fairly good, but in many cases a desire exists for even further optimized rheology control characteristics. Optimized characteristics are manifested frequently not only in improved rheological activity, but also, optionally, in broad compatibility in application-relevant formulations as well (e.g., binders).

WO2011/091812 relates to the use of urea compounds and amide compounds as rheologically active components in baking varnishes. A disadvantage is that the mutual incompatibility of said urea compounds and amide compounds means that they must be metered separately from one another into the baking varnish and are therefore unavailable as an additive mixture to the varnish manufacturer.

The problem addressed by the present invention is therefore that of providing a high-quality rheology control agent which can be used universally and practically.

The solution to this problem is a composition comprising
i) 15-95 wt % of an amide compound (A),
ii) 5-75 wt % of a urea compound (B),
iii) 0-50 wt % of an ionogenic compound (C), and
iv) 0-35 wt % of an organic solvent (D),
where the amide compound (A) has a molar mass of 70 to 600 g/mol, the amide compound (A) contains not more than one amide group with hydrogen bonded to its nitrogen atom, the amide compound (A) has no urea group, no phosphorus, no silicon, and no halogen, and the amide compound (A) is present in accordance with the general formula (I),

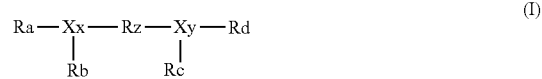

where

Xx is identical or different and is represented by an amide group C(=O)—N which is linked to Rz, Ra, and Rb in accordance with one of the general formulae RzC(=O)—NRaRb (Xx1), RaC(=O)—NRzRb (Xx2), and RbC(=O)—NRzRa (Xx3)

Xy is identical or different and is represented by an amide group C(=O)—N which is linked to Rz, Rc, and Rd in accordance with one of the general formulae RzC(=O)—NRcRd (Xy1), RcC(=O)—NRzRd (Xy2), and RdC(=O)—NRzRc (Xy3)

Rz in each case is identical or different and is represented by a branched or unbranched, saturated or unsaturated hydrocarbon radical which has 1 to 32 carbon atoms and which as heteroatom-containing groups may contain exclusively amino and/or amide groups, Ra, Rb, Rc, and Rd, in each case identically or differently and in each case independently of one another, are represented by hydrogen and/or a branched or unbranched, saturated or unsaturated organic radical containing 1 to 16 carbon atoms, with the proviso that Ra, Rb, Rc, and Rd in their entirety have at least four carbon atoms, not more than one of the radicals from the group of Ra, Rb, Rc, and Rd is present in the form of hydrogen, Ra and Rb and/or Rc with Rd, together with the CO—N moiety joining Ra to Rb and/or Rc to Rd, may together, in accordance with the general formula (α-1), form a cyclic structure having 4 to 10 ring atoms, and/or

Ra and Rb and/or Rc with Rd, together with the N atom joining Ra to Rb and/or Rc to Rd, may together, in accordance with the general formula (β-1), form a cyclic structure having 4 to 7 ring atoms, or

Rb and Rc together with the N atom bonded to each of Rb and Rc, and also with the radical Rz, may, in accordance with the general formula (γ-1), form a cyclic structure having 5 to 7 ring atoms

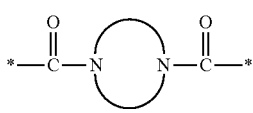

(γ-1)

Ra, Rb, Rc, Rd, and Rz in their entirety have not more than 36 carbon atoms and also not more than 8 heteroatoms from the group of N and O, the urea compound (B) has a molecular weight of at least 350 g/mol and at least one urea group, the ionogenic compound (C) contains a cationic component and an anionic component and is different from the amide compound (A) and from the urea compound (B), and the organic solvent (D) contains no urea group and no ionic group and also has not more than two heteroatoms selected from the group consisting of nitrogen and oxygen.

The components (A), (B), (C) and/or (D) may each be present in the form of different kinds of species, i.e., as mixtures. In addition to the components (A), (B), (C), and (D), the composition of the invention may optionally also comprise further constituents.

The molecular weight of the urea compounds (B) that are relevant in accordance with the invention is limited in the low-molecular range by the fact that urea compounds (B) having molar masses of less than 350 g/mol are generally less active rheologically or completely inactive rheologically. Substances of this kind with little or no activity, having molecular weights below 350 g/mol, are customarily specific monomeric or low-molecular oligomeric compounds of defined molecular weight, and so the statement of a weight-average or number-average molecular weight is unnecessary, given that these compounds generally lack any molecular nonuniformity. The lower limit of 350 g/mol selected according to the claim therefore represents the actual molecular weight of the species and can be determined for example by means of NMR.

The upper limit to the molecular weight of the urea compounds (B), on the other hand, is not critical, provided there is still compatibility between the urea compounds (B) and the other constituents of the rheology control agent and of the subsequent preparation in which the urea compounds (B) are used. The typical compatibility limits are customarily attained by polymeric urea compounds (B) for which only averaged molecular weights can be specified. Customarily suitable as urea compounds (B) are those which possess a weight-average molecular weight of less than 60000 g/mol, although in certain cases it is possible also to use urea compounds which have a higher molecular weight, such as 80000 or 100000 g/mol, for example, provided that compatibility is ensured in the systems in question. If compatibility is lacking, a person of ordinary skill in the art is easily able to employ urea compounds (B) which have a lower weight-average molecular weight. The synthesis of urea compounds (B) with weight-average molecular weights, even of far more than 100000 g/mol, is therefore not a general problem to a person of ordinary skill in the art.

The person of ordinary skill in the art is aware that for higher molecular weight ranges, there are other methods to be preferred for determining the molecular weights, instead of NMR spectroscopy. Determining the weight-average molecular weight of the urea compounds (B) which have a molar mass of more than 1000 g/mol is accomplished, in accordance with the description below, as the weight average of the molar mass distribution determined by gel permeation chromatography (GPC). The GPC molar mass distribution is determined according to DIN 55672 Part 2 of January 2008. The eluent used is a solution of lithium bromide (5 g/l concentration) in dimethylacetamide. Calibration takes place using narrowly distributed, linearly constructed polymethyl methacrylate standards having molecular weights of between 1000000 and 102 g/mol. The temperature of the GPC system as a whole (injector, sample plate, detectors, and columns) is 80° C. The weight-average molar masses of the urea compounds (B) with 350 g/mol up to about 1000 g/mol can be determined for example by NMR, (B) by forming ratios of the integrals of relevant NMR resonance signals. The choice of the method of determination in this range is not critical, however, since all that should be ensured in accordance with the invention is that the urea compounds (B)—as explained above—have a molecular weight of at least 350 g/mol.

In one particularly preferred embodiment of the invention, therefore, 70 to 100 wt % of the urea compound (B) has a molecular weight of at least 350 g/mol up to a maximum of 60000 g/mol.

The composition of the invention is an application-friendly presentation form which can be provided in liquid form. The end user (e.g., user or formulator of paints, varnishes, plastics or adhesives) can employ the additive simply and with little risk of application errors. The fact that the rheologically active additive components (A) and (B) are present in a mixture reduces the cost and complexity of storage for the paint or varnish user (now only one storage container for (A) and (B)) and allows paint or varnish production to be accelerated, since there are fewer components to be metered. Features deserving of emphasis are the high storage stability of the composition of the invention, and the universal applicability in a variety of systems (e.g., in different kinds of binders).

The composition of the invention exhibits particularly good rheological activity. For example, the rheological activity of the composition can be determined on the basis of the sag resistance (sagging limit) or the gel strength of a corresponding paint or varnish formulation. Furthermore, the composition of the invention exhibits broad compatibility (criterion: e.g., bittiness, hazing and/or clouding in the formulation) in application-relevant formulations (e.g. binders).

Critical to the rheological performance and/or suitability as rheology control agent is the interaction of two rheologically active ingredients, namely the amide compound (A) and the urea compound (B).

Besides the above-described components (A), (B), (C), and (D), the composition of the invention may also comprise components which are different from each of these. What is essential is that these different (from A, B, C and D in each case) components do not impair the quality of the composition of the invention. Said impairments relate in particular to the suitability as (rheological) additive. If the composition of the invention has too high a fraction of compounds which are not very inert (e.g., functional groups which may give rise to crosslinking reactions), the quality may be impaired (for example, because the storage stability is lowered). In terms of application, moreover, the composition of the invention ought to be readily manageable and to contain as few components as possible which bring no benefit to the use as additive. For the reasons above, it is possible to state the following initially concerning the components that are different from each of A, B, C, and D:

The components that are different from each of A, B, C, and D are present in the composition of the invention in total preferably at not more than 50 wt %, but more preferably at not more than 30 wt %, but very preferably at not more than 20 wt %, but especially preferably at not more than 10 wt %. In further specific embodiments, they are present at not more than 5 wt % and at not more than 3 wt %. In another particularly preferred embodiment, the composition is substantially free from components that are different from each of A, B, C, and D.

The components that are different from each of A, B, C, and D have in their entirety preferably a hydroxyl number of less than 15 mg KOH/g (becomes relevant if corresponding hydroxyl-containing species are present).

The components different from each of A, B, C, and D are preferably not in the form of crosslinking agents. Crosslinking agents in this sense are, for example, polyisocyanates, amino resins, such as melamine resins, urea-formaldehyde resins, and benzoguanamine resins, polyamines, and polyepoxides.

The composition of the invention preferably contains no pigments and no solid fillers.

The composition of the invention preferably contains less than 5 wt %, more preferably less than 3 wt %, and very preferably less than 1 wt % of water.

Organic components of the composition of the invention, which in each case are not assigned to components A, B, C, and D and which have a molecular weight of more than 800 g/mol (preferably more than 500 g/mol), have in total preferably at most a weight fraction in the composition of the invention of 35 wt %, more preferably of at most 8 wt %. Higher-molecular components customarily increase the viscosity and hence the ease of handling. The molar masses of the components having a molecular weight of up 800 g/mol (or up to 500 g/mol) can be determined customarily by NMR, by forming ratios of the integrals of relevant NMR resonance signals. In one particularly preferred embodiment, the composition is substantially free from such additional components having a molecular weight of more than 800 g/mol (preferably of more than 500 g/mol).

In one embodiment of the invention, the composition of the invention comprises
i) 30-90 wt % of the amide compound (A),
ii) 8-55 wt % of the urea compound (B),
iii) 0-15 wt % of the ionogenic compound (C), and
iv) 2-25 wt % of the organic solvent (D).

The presence of the solvent (D) may be practicable; in many cases, alternatively, the solvent is omitted as well. In that case it is generally useful for the mixture of the amide compound (A) and urea compound (B) (optionally in the presence of the ionogenic compound (C)) to be provided in liquid or single-phase form (in the absence of D).

A high solvent fraction means that in the end application, an undesirably high quantity of the composition in question has to be introduced into the application system in order to achieve a sufficiently high concentration of the active ingredient components (A) and (B) that are active rheologically.

The organic solvent is selected by the skilled person with a view in particular to the later use as (rheological) additive (in particular, to be sufficiently inert and fluid). Corresponding solvents customarily have a molecular weight of not more than 250 g/mol. If solvents are used at all, it is preferred for not more than three, more preferably not more than two solvents different from one another to be used. Very preferably no solvent at all is used or only one solvent at most is used.

In one preferred embodiment of the invention, the composition of the invention comprises
i) 40-85 wt % of the amide compound (A),
ii) 15-60 wt % of the urea compound (B),
iii) 0-5 wt % of an ionogenic compound (C), and
iv) 0-25 wt % of the organic solvent (D).

The components that are different from each of A, B, C, and D are then present preferably in the composition of the invention in total with a fraction of 0-30 wt %, more preferably with a fraction of 0-20 wt %, very preferably with a fraction of 0-10 wt %, especially preferably with a fraction of 0-5 wt % or with a fraction of 0-3 wt %.

In one particularly preferred embodiment of the invention, the composition of the invention comprises
i) 45-82 wt % of the amide compound (A),
ii) 18-55 wt % of the urea compound (B),
iii) 0-4 wt % of an ionogenic compound (C), and
iv) 0-10 wt % of the organic solvent (D).

In one decidedly typical embodiment of the invention, the composition of the invention comprises
i) 50-75 wt % of the amide compound (A),
ii) 25-50 wt % of the urea compound (B),
iii) 0-3 wt % of an ionogenic compound (C), and
iv) 0-5 wt % of the organic solvent (D).

The components that are different from each of A, B, C, and D are then present preferably in the composition of the invention in total with a fraction of 0-20 wt %, more preferably with a fraction of 0-10 wt %, very preferably with a fraction of 0-5 wt %, especially preferably with a fraction of 0-3 wt %.

In one preferred embodiment of the invention, on the one hand 50-100 wt % of the amide compound (A) has no amide group with hydrogen bonded to its nitrogen atom, and on the other hand this 50-100 wt % of the amide compound (A) is also present in accordance with a general formula (I) in which none of the radicals from the group of Ra, Rb, Rc, and Rd is represented by hydrogen.

Frequently 50-100 wt % of the amide compound (A) is present in accordance with the general formula (Ia)

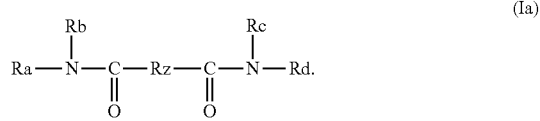

Not unusually 50-100 wt % of the amide compound (A) is present in accordance with the general formula (Ia), where Ra and Rb and/or Rc with Rd, together with the N atom joining Ra to Rb and/or Rc to Rd, in accordance with the general formula (β-1), together form a branched or unbranched, saturated or unsaturated cyclic structure having 4 to 7 ring atoms which has not more than two heteroatoms from the group consisting of O and N.

Viewed schematically, such a structure may then be present as follows:

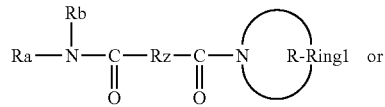

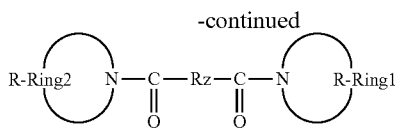

R-Ring1 and R-Ring2 are then typically present in the form of a bridging aliphatic radical having 4 to 6 C atoms, which optionally includes an ether group as substituent.

Depending on the type of structure, the respective amide compounds (A) are prepared using known methods of organic chemistry. The above types of structure are usefully prepared starting from dicarboxylic acids or corresponding carboxylic acids of higher functionality, by reaction of suitable amines. Alternatively to the corresponding carboxylic acids it is also possible to react their reactive derivatives (e.g., anhydrides, halides or esters) with a corresponding amine for the amidation. One possible synthesis route lies in the reaction of a corresponding carboxylic acid with thionyl chloride to form the acyl chloride (typical conditions: 5 h at 60° C., thionyl chloride used optionally in excess and removed by distillation after reaction), dissolution in an anhydrous organic solvent (e.g., toluene), and the reaction therein of the acyl chloride with a suitable amine (typical conditions: start reaction at 0° C. and allow warming to room temperature over 6 h). The subsequent purification may be accomplished for example by distillation.

Compounds of type (Ib) (see below) are prepared preferably using corresponding cyclic amines, as for example piperidine, pyrrolidine or morpholine. Accordingly, the preparation of corresponding amides is described for example in U.S. Pat. No. 3,417,114. Furthermore, the preparation processes which can be used for preparing acid amides from monocarboxylic acids can be transposed analogously to the preparation of acid amides from dicarboxylic acids and carboxylic acids of higher functionality: corresponding preparation processes are for example described in U.S. Pat. Nos. 2,667,511, 3,288,794, 3,751,465 or in U.S. Pat. No. 3,674,851.

In another embodiment, 50-100 wt % of the amide compound (A) is present in accordance with the general formula (Ia), where Ra, Rb, Rc and/or Rd in each case are not present in cyclic structures.

According to another variant of the invention, the general formula (I) for 50-100 wt % of the amide compound (A) is present in accordance with the general formula (Ib)

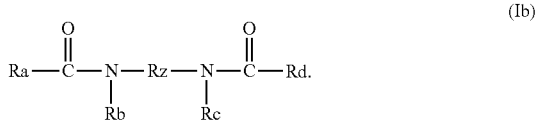

(Ib)

In one specific embodiment the general formula (I) for 50-100 wt % of the amide compound (A) is present in accordance with the general formula (Ib), where Rb and Rc together with the N atom bonded to each of Rb and Rc, and also with the radical Rz, in accordance with the general formula (γ-1), form a branched or unbranched, saturated or unsaturated cyclic structure having 5 to 7 ring atoms which has not more than two heteroatoms from the group consisting of O and N.

Preferred in this case is a cyclic structure having six ring atoms, which is obtainable with particular preference by reaction of piperazine with a corresponding carboxylic acid (or reactive derivative thereof):

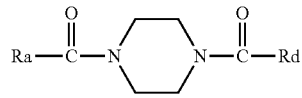

In another embodiment the general formula (I) for 50-100 wt % of the amide compound (A) is present in accordance with the general formula (Ib), where Ra and Rb and/or Rc with Rd, together with the CO—N moiety joining Ra to Rb and/or Rc to Rd, in accordance with the general formula (α-1), together form a branched or unbranched, saturated or unsaturated cyclic structure having 4 to 10 ring atoms which has not more than two heteroatoms from the group consisting of O and N.

This may be illustrated by way of example by the two following structures:

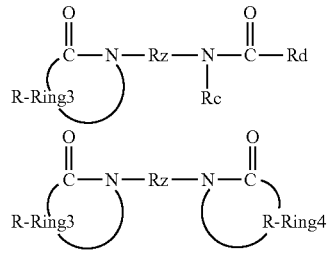

The radical Rz often comprises C2 to C6 alkylene radicals, or a cyclohexylene radical or xylylene radical ($-CH_2-C_6H_4-CH_2-$).

R-Ring3 and R-Ring4 are frequently present in the form of $-(CH_2)_3-$ and/or of $-(CH_2)_4-$.

Particularly typically, R-Ring3 and R-Ring4 are each present in the form of $-(CH_2)_3-$.

Depending on the type of structure, the respective amide compounds (A) are prepared using known methods of organic chemistry. For example, by reaction of alkylenediamines, arylenediamines, and alkylarylenediamines or (poly)etherdiamines (where R possesses no further amino or amide groups) or of corresponding polyamines of higher functionality (where R does possess further amino or amide groups) with corresponding, optionally substituted carboxylic acids or derivatives thereof (e.g., halides, anhydrides, esters, and—as a special case of esters—lactones as well). Other types of structure are prepared preferably by reaction of corresponding diamines or polyamines with corresponding lactones. The preparation of further types is described for example in U.S. Pat. Nos. 5,326,880, 3,989,815, and in U.S. Pat. No. 6,497,886.

The rheological activity of the amide compound (A) is boosted significantly by the presence of the urea compound (B).

Frequently 70-100 wt % of the urea compound (B) either has at least two urea groups or has at least one urea group and at least one urethane group.

In one embodiment 50-100 wt % of the urea compound (B) is present in accordance with the general formula (II)

(II)

where
- R³¹ and R³² each identically or differently and also each independently of one another are represented by a branched or unbranched, saturated or unsaturated organic radical which contains 1-100 carbon atoms and which has not more than one urea group each and not more than one urethane group each,
- R³³ and R³⁴ each identically or differently and also each independently of one another are represented by branched or unbranched polyester radicals containing 1-300 carbon atoms and optionally containing ether groups, branched or unbranched polyether radicals containing 2-300 carbon atoms, branched or unbranched polyamide radicals containing 1-300 carbon atoms, polysiloxane radicals containing 3 to 100 silicon atoms, branched or unbranched C2-C22 alkylene radicals, branched or unbranched C3-C18 alkenylene radicals, C5-C12 arylene radicals and/or branched or unbranched C7-C22 arylalkylene radicals,
- Z and W each identically or differently and also each independently of one another are represented by NH—CO—O and/or NH—CO—NH,
- n is in each case identical or different and is represented by an integer from 1 to 150, preferably from 2 to 120.

Not unusually 50-100 wt % of the urea compound (B) has in each case a molecular weight of 2000 to 55000 and also 4-150 urea groups.

In one specific embodiment 50-100 wt % of the urea compound (B) is present in each case in accordance with one of the general formulae selected from the group consisting of (IIIa), (IIIb), (IIIc), and (IIId)

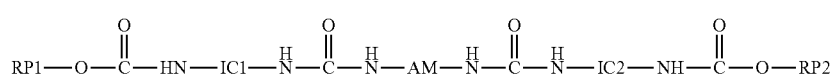
(IIIa)

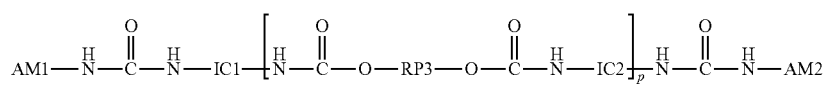
(IIIb)

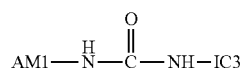
(IIIc)

(IIId)

where
AM is identical or different and is represented by a linear or branched, saturated or unsaturated, aliphatic, aromatic or aliphatic-aromatic organic radical having 2 to 50 C atoms,
AM1 and AM2 in each case are identical or different and in each case independently of one another represented by a linear or branched, saturated or unsaturated, aliphatic, aromatic or aliphatic-aromatic organic radical having 1 to 50 C atoms,
IC1 and IC2 are in each case identical or different and in each case independently of one another represented by a linear or branched, saturated or unsaturated, aliphatic, aromatic or aliphatic-aromatic hydrocarbon radical having 2 to 40 C atoms,
IC3 is identical or different and is represented by a linear or branched, saturated or unsaturated, aliphatic, aromatic or aliphatic-aromatic hydrocarbon radical having 2 to 24 carbon atoms,
RP1 and RP2 are in each case identical or different and in each case independently of one another represented by a linear or branched, saturated or unsaturated, aliphatic, aromatic or aliphatic-aromatic organic radical having 1 to 24 C atoms and/or by a polyether radical having 1 to 120 ether oxygen atoms and/or by a polyester radical having 1 to 100 ester groups and optionally containing ether groups, and/or by a polyamide radical having 1 to 100 amide groups, and/or by a polysiloxane radical having 3 to 100 silicon atoms,
RP3 is identical or different and is represented by a linear or branched, saturated or unsaturated, aliphatic, aromatic or aliphatic-aromatic hydrocarbon radical having 2 to 24 C atoms and/or by a (poly)ether radical having 1 to 120 ether oxygen atoms and/or by a polyamide radical having 1 to 100 amide groups and/or by a polysiloxane radical having 3 to 100 silicon atoms and/or by a polyester radical having 1 to 100 ester groups and optionally containing ether groups, and
p is identical or different and is represented by 0 and/or 1.

Frequently 70-100 wt % of the urea compound (B) is present in each case in accordance with one of the general formulae selected from the group consisting of (IIIa), (IIIb), (IIIb), and (IIId), where
AM is identical or different and is selected from the group consisting of

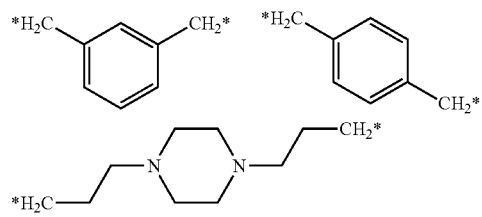

-continued

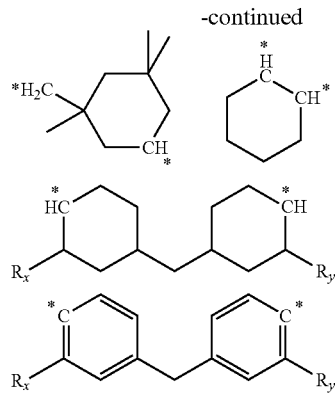

where $R_x$ and $R_y$ are identical or different and are in each case independently represented by $CH_3$ and/or hydrogen, $(CH_2)_q$ where q is identical or different and is represented by an integer from 2 to 12, AM1 and AM2 are each identical or different and are selected from the group consisting of n-propyl, isopropyl, butyl, isobutyl, tert-butyl, lauryl, oleyl, stearyl, polyisobutylene, and polyethers having 2 to 40 ether oxygen atoms, benzyl, methylbenzyl, cyclohexyl, carboxyalkyl, hydroxyalkyl, and alkylalkoxysilane, IC1 and IC2 are each identical or different and are selected from the group consisting of

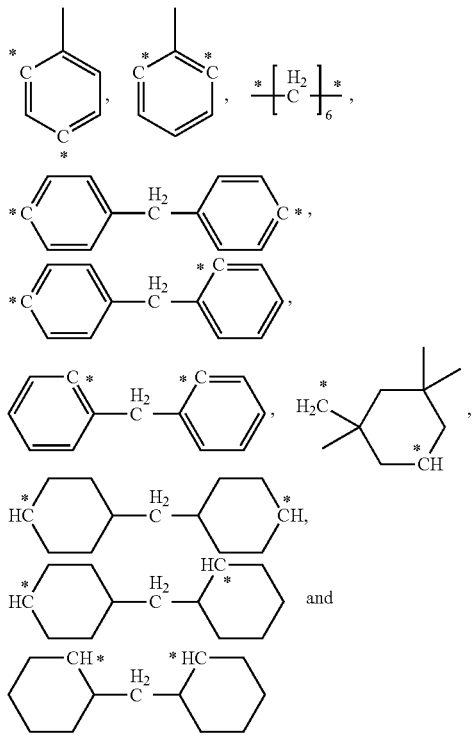

IC3 is identical or different and is selected from the group consisting of methyl, ethyl, phenyl, benzyl, cyclohexyl, and stearyl, RP1 and RP2 are each identical or different and are selected from the group consisting of branched or unbranched C1 to C18 alkyl, oleyl, benzyl, allyl, polyether radical preferably containing structural units of ethylene oxide, propylene oxide and/or butylene oxide, and polyester radical containing structural units of epsilon-caprolactone and/or delta-valerolactone, RP3 is identical or different and is selected from the group consisting of linear or branched C1 to C18 alkylene, linear or branched C2 to C18 alkenylene, polyether preferably containing structural units of ethylene oxide, propylene oxide and/or butylene oxide and having 1 to 25 ether oxygen atoms.

In one specific embodiment 70-100 wt % of the urea compound (B) in each case is preparable by reaction of monofunctional amines with isocyanates oligomerized by isocyanurate formation and/or uretdione formation.

In one typical embodiment 95-100 wt %, preferably 98-100 wt %, of the urea compound (B) contains in each case at least one molecule segment of the general formula (IVa)

$$\text{—O—CO—NH—Y}_1\text{—NH—CO—NH—} \tag{IVa}$$

where $Y_1$ is identical or different and is represented by a saturated or unsaturated, branched or unbranched hydrocarbon radical containing 6 to 20 carbon atoms, and in each case contains no molecule segment of the general formula (IVb)

$$\text{—O—CO—NH—Y}_2\text{—NH—CO—O—} \tag{IVb}$$

where $Y_2$ is identical or different and is represented by a saturated or unsaturated, branched or unbranched hydrocarbon radical containing 6 to 20 carbon atoms.

The urea compounds (B) may be prepared in a known way by reaction of corresponding isocyanates with amines. Preparation processes for urea compounds of this kind are described in more detail for example in EP 0006252, DE 2822908, DE 10241853, DE 19919482, EP 1188779, and in DE 102008059702.

The preparation in particular of higher-molecular polyurea compounds is described for example in EP 2292675.

In one embodiment of the invention, the composition of the invention comprises the ionogenic compound (C). This compound is usually present in the form of a salt, preferably a lithium, calcium or magnesium salt, more preferably a lithium or calcium salt. Preferred as anion (counterion) is halide, pseudohalide, formate, acetate and/or nitrate, more preferably chloride, acetate and/or nitrate. The ionogenic compounds (C) also include ionic liquids, which are not organic solvents in the sense of the invention.

In one embodiment of the invention, the composition of the invention comprises 0.5-4.0 wt % of the ionogenic compound (C), where 50-100 wt % of the ionogenic compound (C) is present in the form of lithium salt or calcium salt, preferably in the form of the chloride, acetate and/or nitrate thereof.

The composition of the invention is suitable preferably for rheology control, more particularly for thixotroping, of liquid systems or liquid mixtures.

These liquid mixtures are present preferably in the form of a coating, more particularly a paint or varnish, a plastics formulation, a pigment paste, a sealant formulation, cosmetics, a ceramic formulation, an adhesive formulation, an encapsulating composition, a building material formulation, a lubricant, a filling compound, a printing ink or a liquid ink (e.g., an inkjet ink). A further use as auxiliaries for drift reduction or drift avoidance in the context of spraying operations ("drift reduction/deposition aids") is possible.

The composition of the invention is suitable for rheology control, more particularly for thixotroping, of liquid systems.

The invention also relates to the use of the composition of the invention for rheology control, more particularly for thixotroping, of a liquid mixture.

The liquid mixture may be present in the form of a coating, more particularly a paint or varnish, a plastics formulation, a pigment paste, a sealant formulation, cosmetics, a ceramic formulation, an adhesive formulation, an encapsulating composition, a drilling mud solution, a building material formulation, a lubricant, a filling compound, a printing ink or a liquid ink.

Lastly the present invention relates to a preparation which is present in the form of a paint or varnish, a plastics formulation, a pigment paste, a sealant formulation, cosmetics, a ceramic formulation, an adhesive formulation, an encapsulating composition, a building material formulation, a lubricant, a drilling mud solution, a filling compound, a printing ink or a liquid ink and to which 0.1 to 7.5 wt % of the composition of the invention has been added.

Particularly preferred is the use of the composition of the invention as rheology control agent, preferably as thixotropic agent, for the rheology control of paints and varnishes, printing inks, liquid inks (such as inkjet inks, for example), plastics formulations, cosmetic preparations, building material formulations, formulations for use in petroleum and natural gas extraction, lubricants and/or adhesives.

The paints and varnishes, printing inks and liquid (inkjet) inks may be alternatively solvent-containing or else solvent-free or water-based paints and varnishes, printing inks, and liquid inkjet inks. Paints and varnishes can be used in a very wide variety of fields of application, in sectors including automobile finishes, architectural coatings, protective coatings (painting of ships and bridges, among others), can coatings and coil coatings, wood coatings and furniture coatings, industrial coatings, coating systems for plastics, wire enamels, coatings on foods and seed, and also as what are called color resists, which are used for color filters in LC displays, for example. The sector of application of paints and varnishes also includes paste-like materials, which generally have a very high fraction of solid material and a low fraction of liquid components, examples being pigment pastes or else pastes based on finely divided metal particles or metal powders (based for example on silver, copper, zinc, aluminum, bronze, brass).

The plastics formulations may comprise the (liquid) starting materials for the production of plastics materials, which are reacted preferably by a chemical crosslinking process ("curing" to give a thermoset). Preferred plastics preparations are therefore unsaturated polyester resins, vinyl ester resins, acrylate resins, epoxy resins, polyurethane resins, formaldehyde resins (such as melamine-formaldehyde or urea-formaldehyde). They may be cured under a wide variety of different conditions, as for example at room temperature (cold-curing systems) or at elevated temperature (hot-curing systems), where appropriate also with application of pressure ("closed mold" application, sheet molding compound or bulk molding compound). The preferred plastics formulations also include PVC plastisols.

The cosmetic preparations may comprise diverse liquid compositions which are used in the personal care or else health care sectors, as for example lotions, creams, pastes (e.g., toothpaste), foams (e.g., shaving foam), gels (e.g., shaving gel, shower gel, active pharmaceutical ingredients formulated as gels), hair shampoo, liquid soaps, nail varnishes, lipsticks, hair colorants.

The building material formulations may comprise materials which are liquid or pastelike on processing and which are employed in the construction sector and become solid after hardening, as for example hydraulic binders such as concrete, cement, mortar, tile adhesive, plaster.

The lubricants are agents which are used for lubrication, in other words which serve to reduce friction and wear, and also for force transmission, cooling, vibration damping, sealing, and corrosion control, with preference here being given to liquid lubricants and lubricating greases. Additionally, slip agents and drilling fluids (the latter as used in petroleum extraction) are included in terms of definition among the lubricants.

The adhesives may be all processing materials which are liquid under processing conditions and which are able to join adherends by surface adhesion and internal strength. Adhesives may be solvent-containing, solvent-free or water-based.

The invention will be elucidated in more detail below, using examples.

In the examples which follow, the amine number was determined according to DIN 16945. In analogy, the OH number was determined according to DIN/ISO 4629.

Commercial raw materials employed were as follows:

| Name | Description | Manufacturer |
|---|---|---|
| Borchi Nox M 2 | Synthetic antiskinning agent (methyl ethyl ketoxime) | OMG Borchers GmbH |
| BYK-066 | Silicone-containing defoamer | BYK-Chemie GmbH |
| Dowanol PM | Methoxypropanol | Dow Chemical Company |
| Dowanol PMA | 1,2-Propanediol monoacetate monomethyl ether | Dow Chemical Company |
| Epikote 1001-X 75 | Bisphenol A resin, in solution in xylene | Hexion Specialty Chemicals |
| Isopar H | Hydrocarbon solvent with low odor and low aromatic fraction (primarily consisting of isoalkanes) | ExxonMobil Chemical |
| Kraton 1118 AS | Styrene-butadiene block copolymer | Kraton Performance Polymers |
| Nuodex Combi APB | Lead-free and barium-free combination drier | Elementis Specialties B.V. |
| Palapreg P 17-02 | Unsaturated polyester resin for producing fiber-reinforced plastics or unreinforced filled products | DSM Composite Resins |
| Palapreg H814-01 | Solution of polystyrene in styrene | DSM Composite Resins |
| Setalux D A 870 BA | Polyisocyanate-crosslinking acrylate resin, 70% in butyl acetate | Nuplex Resins GmbH |
| Synthalat W48 | Water-thinnable, specially modified alkyd resin, approximately 35% in BG/ammonia/water (8:2.3:54.7) | Synthopol Chemie |
| Worléekyd S 366 | Long-oil alkyd resin, 60% in Isopar H | Worlée Chemie GmbH |
| Worléekyd S 351 | Medium-fatty, air-drying alkyd resin modified with soybean oil | Worlée Chemie GmbH |

Example 1b

A reaction vessel (round-bottom flask with stirrer, reflux condenser, water separator, and dropping funnel) was charged under a nitrogen atmosphere at 60° C. with 412.5 g (2.48 mol) of hexamethylenediamine in the form of a 70% strength aqueous solution. Over the course of minutes, with stirring, 430.0 g (5.0 mol) of butyrolactone were added dropwise. The exothermic reaction raised the temperature to 90° C. Then 0.4 g of p-toluenesulfonic acid was added.

The temperature was raised via 20-minute temperature ramps, by 10° C. in each case, to 170° C. This was followed by heating to a final temperature of 250° C., which was maintained for 18.5 hours. Throughout the reaction time, the water of reaction was removed from the reaction mixture by distillation. The reaction product is a yellow, slightly viscous liquid having an amine number of 15.4 mg KOH/g.

For the removal of residual reactants, the reaction product was purified by distillation with a thin-film evaporator at 120° C. and <1 mbar. The amine number thereafter was <1 mg KOH/g.

Example 2b

A reaction vessel (round-bottom flask with stirrer, reflux condenser, water separator, and dropping funnel) was charged under a nitrogen atmosphere at 60° C. with 42.0 g (0.7 mol) of ethylenediamine. Over the course of 45 minutes, with stirring, 132.6 g (1.54 mol) of butyrolactone were added dropwise. The exothermic reaction raised the temperature to 140° C.

The temperature was thereafter raised via 45-minute temperature ramps, by 10° C. in each case, to 250° C. This final temperature was maintained for 9 hours. Throughout the reaction time, the water of reaction was removed from the reaction mixture by distillation. The end product is crystalline.

Example 3b

A reaction vessel (round-bottom flask with stirrer, reflux condenser, water separator, and dropping funnel) was charged under a nitrogen atmosphere at 60° C. with 74.1 g (1.0 mol) of 1,3-propanediamine. Over the course of 75 minutes, with stirring, 189.4 g (2.2 mol) of butyrolactone were added dropwise. The exothermic reaction raised the temperature to 120° C. Then 0.4 g of p-toluenesulfonic acid was added.

The temperature was thereafter raised via 45-minute temperature ramps, by 10° C. in each case, to 250° C. This final temperature was maintained for 9 hours. Throughout the reaction time, the water of reaction was removed from the reaction mixture by distillation. The reaction product had a hydroxyl number of 4.0.

Example 4b

A reaction vessel (round-bottom flask with stirrer, reflux condenser, water separator, and dropping funnel) was charged under a nitrogen atmosphere at 60° C. with 37.1 g (0.5 mol) of 1,2-propanediamine. Over the course of 40 minutes, with stirring, 94.7 g (1.1 mol) of butyrolactone were added dropwise. The exothermic reaction raised the temperature to 110° C.

The temperature was thereafter raised via 45-minute temperature ramps, by 10° C. in each case, to 250° C. This final temperature was maintained for 9 hours. Throughout the reaction time, the water of reaction was removed from the reaction mixture by distillation. The end product is crystalline.

Example 5b

A reaction vessel (round-bottom flask with stirrer, reflux condenser, water separator, and dropping funnel) was charged under a nitrogen atmosphere at 60° C. with 64.9 g (0.73 mol) of 1,4-diaminobutane. Over the course of 30 minutes, with stirring, 69.7 g (0.81 mol) of butyrolactone were added dropwise. The exothermic reaction raised the temperature to 100° C.

The temperature was thereafter raised via 45-minute temperature ramps, by 10° C. in each case, to 250° C. This final temperature was maintained for 9 hours. Throughout the reaction time, the water of reaction was removed from the reaction mixture by distillation. The end product is crystalline.

Example 6b

A reaction vessel (round-bottom flask with stirrer, reflux condenser, water separator, and dropping funnel) was charged under a nitrogen atmosphere at 100° C. with 72.1 g (0.5 mol) of melted 1,8-octamethylenediamine. Over the course of 20 minutes, with stirring, 94.7 g (1.1 mol) of butyrolactone were added dropwise. The exothermic reaction raised the temperature to 160° C.

The temperature was thereafter raised via 45-minute temperature ramps, by 10° C. in each case, to 250° C. This final temperature was maintained for 12 hours. Throughout the reaction time, the water of reaction was removed from the reaction mixture by distillation. The end product is liquid.

Example 7b

A reaction vessel (round-bottom flask with stirrer, reflux condenser, water separator, and dropping funnel) was charged under a nitrogen atmosphere at 80° C. with 84.1 g (0.42 mol) of melted dodecanediamine. Over the course of 20 minutes, with stirring, 79.5 g (0.92 mol) of butyrolactone were added dropwise. The exothermic reaction raised the temperature to 135° C.

The temperature was thereafter raised via 20-minute temperature ramps, by 10° C. in each case, to 250° C. This final temperature was maintained for 11 hours. 0.4 g of p-toluenesulfonic acid was added. Throughout the reaction time, the water of reaction was removed from the reaction mixture by distillation. The end product is solid and bright red in color.

Example 8b

A reaction vessel (round-bottom flask with stirrer, reflux condenser, water separator, and dropping funnel) was charged under a nitrogen atmosphere at 30° C. with 68.1 g (0.5 mol) of m-xylylenediamine. Over the course of 10 minutes, with stirring, 94.1 g (1.1 mol) of butyrolactone were added dropwise. The batch was heated initially to 100° C., then the temperature was raised via 20-minute temperature ramps by 10° C. in each case. At 120° C., an exothermic reaction was ascertainable. The temperature rose to 170° C. Thereafter the temperature was raised further via 20-minute temperature ramps by 10° C. in each case up to 250° C., and was maintained for 7 hours. 0.4 g of p-toluenesulfonic acid was added, and stirring was continued at 250° C. for 6 hours more. Throughout the reaction time, the water of reaction was removed from the reaction mixture by distillation. The reaction product is an orange-colored liquid of high viscosity with an amine number of 0.6 mg KOH/g.

Example 9b

A reaction vessel (round-bottom flask with stirrer, reflux condenser, water separator, and dropping funnel) was charged under a nitrogen atmosphere at 30° C. with 57.1 g (0.5 mol) of 1,2-diaminocyclohexane. Over the course of 10 minutes, with stirring, 94.1 g (1.1 mol) of butyrolactone were added dropwise. The temperature was raised via 20-minute temperature ramps by 10° C. in each case. At 90° C., an exothermic reaction was ascertainable. The temperature rose to 104° C. Thereafter the temperature was raised further via 20-minute temperature ramps, by 10° C. in each case, to 250° C., and was maintained for 6 hours. 0.4 g of p-toluenesulfonic acid was added, and stirring was continued at 250° C. for 6 hours more. Throughout the reaction time, the water of reaction was removed from the reaction mixture by distillation. The end product is solid.

Example 10b

A reaction vessel (round-bottom flask with stirrer, reflux condenser, water separator, and dropping funnel) was charged under a nitrogen atmosphere at 30° C. with 68.1 g (0.4 mol) of isophoronediamine. Over the course of 10 minutes, with stirring, 75.8 g (0.88 mol) of butyrolactone were added dropwise. The batch was heated initially to 100° C., then the temperature was raised via 20-minute temperature ramps by 10° C. in each case. At 120° C., an exothermic reaction was ascertainable. The temperature rose to 160° C. Thereafter the temperature was raised further via 20-minute temperature ramps, by 10° C. in each case, to 250° C., and was maintained for 6 hours. 0.4 g of p-toluenesulfonic acid was added, and stirring was continued at 250° C. for 6 hours more. Throughout the reaction time, the water of reaction was removed from the reaction mixture by distillation. The reaction product is a liquid having an amine number of 15.6 mg KOH/g.

Example 11b

A reaction vessel (round-bottom flask with stirrer, reflux condenser, water separator, and dropping funnel) was charged under a nitrogen atmosphere at 30° C. with 92.0 g (0.4 mol) of polyetherdiamine (Jeffamine D230 from Huntsman). Over the course of 10 minutes, with stirring, 75.8 g (0.88 mol) of butyrolactone were added dropwise. The temperature was via 20-minute temperature ramps, by 10° C. in each case, to 250° C. maintained at this temperature for 6 hours. 0.4 g of p-toluenesulfonic acid was added and stirring continued at 250° C. for 6 hours more. Throughout the reaction time, the water of reaction was removed from the reaction mixture by distillation. The end product is a slightly viscous liquid having an amine number of 6 mg KOH/g.

Example 12b

A reaction vessel (round-bottom flask with stirrer, reflux condenser, water separator, and dropping funnel) was charged under a nitrogen atmosphere at 30° C. with 120.0 g (0.3 mol) of polyetherdiamine (Jeffamine D400 from Huntsman). Over the course of 10 minutes, with stirring, 56.8 g (0.66 mol) of butyrolactone were added dropwise. The temperature was via 20-minute temperature ramps, by 10° C. in each case, to 250° C. maintained at this temperature for 6 hours. 0.4 g of p-toluenesulfonic acid was added and stirring continued at 250° C. for 6 hours more. Throughout the reaction time, the water of reaction was removed from the reaction mixture by distillation. The end product is a slightly viscous liquid having an amine number of 7.7 mg KOH/g.

Example 13b

A reaction vessel (round-bottom flask with stirrer, reflux condenser, water separator, and dropping funnel) was charged under a nitrogen atmosphere at 80° C. with 200.0 g (0.1 mol) of polyetherdiamine (Jeffamine D2000 from Huntsman). Over the course of 10 minutes, with stirring, 18.9 g (0.22 mol) of butyrolactone were added dropwise. The temperature was via 20-minute temperature ramps, by 10° C. in each case, to 200° C. maintained at this temperature for 6 hours. 0.4 g of p-toluenesulfonic acid was added and stirring continued at 250° C. for 6 hours more. Throughout the reaction time, the water of reaction was removed from the reaction mixture by distillation. The end product is a viscous liquid having an amine number of 6.5 mg KOH/g.

Example 14b

A reaction vessel (round-bottom flask with stirrer, reflux condenser, water separator, and dropping funnel) was charged under a nitrogen atmosphere at 80° C. with 81.7 g (0.39 mol) of 4,9-dioxadecane-1,2-diamine. Over the course of 10 minutes, with stirring, 75.7 g (0.87 mol) of butyrolactone were added dropwise. The temperature was via 20-minute temperature ramps, by 10° C. in each case, to 200° C. maintained at this temperature for 6 hours. 0.4 g of p-toluenesulfonic acid was added and stirring continued at 250° C. for 6 hours more. Throughout the reaction time, the water of reaction was removed from the reaction mixture by distillation. The end product is a slightly viscous liquid having an amine number of 3.5 mg KOH/g.

Example 15b

A reaction vessel (round-bottom flask with stirrer, dropping funnel, and reflux condenser) was charged under a nitrogen atmosphere with 315.0 g (1.9 mol) of dimethyl glutarate and 508.0 g (3.8 mol) of dibutylamine. The reaction mixture was stirred at 100° C. for 2 hours. Then a water separator was connected to the apparatus and the temperature was raised to 170° C. In this procedure, 200 g of methanol were separated off. After the end of the reaction time, the reaction mixture had an amine number of 73 mg KOH/g.

For the removal of residual reactants, the reaction product was purified by distillation using a thin-film evaporator at 120° C. and <1 mbar. The amine number thereafter was <4.5 mg KOH/g.

Example 16b

In a four-neck flask with stirrer, thermometer and water separator, 84.0 g of 5-(dimethylamino)-2-methyl-5-oxomethyl pentanoate (0.449 mol) and 116.0 g of dibutylamine (0.898 mol) are heated at 150° C. with stirring. The methanol produced is separated off on a water separator. The mixture is heated at this temperature for 16 hours. It is then heated to 170° C. and a vacuum of 0.8 mbar is applied for 2 hours to remove volatile constituents. The clear, liquid product obtained is checked by IR spectroscopy for the absence of the ester band at 1711 cm$^{-1}$: no ester band was detected. Yield: 119 g of clear liquid (=93% of the theoretical yield).

Example 17b

In a four-neck flask with stirrer, thermometer and water separator, 90.8 g of 5-(dimethylamino)-2-methyl-5-oxomethyl pentanoate (0.485 mol) and 130.0 g of oleylamine (0.482 mol) are heated at 150° C. with stirring. The methanol produced is separated off on a water separator. The mixture is heated at this temperature for 10 hours. It is then cooled to 80° C. and at this temperature a vacuum of 0.8 mbar is applied for 2 hours to remove the residual volatile constituents. The clear, liquid product obtained is checked by IR spectroscopy for the absence of the ester band at 1711 cm$^{-1}$: no ester band was detected. Yield: 198 g of clear paste-like fluid (=97% of the theoretical yield).

Example 18t

In a four-neck flask with stirrer, dropping funnel, thermometer and water separator, 140.8 g of 5-(dimethylamino)-2-methyl-5-oxomethyl pentanoate (0.752 mol) and 43.7 g of 1,6-hexamethylenediamine (0.376 mol) are heated at 180° C. with stirring. The methanol produced is separated off on a water separator. The mixture is heated at this temperature for 10 hours. It is then cooled to 150° C. and at this temperature a vacuum of 0.8 mbar is applied for 2 hours to remove the residual volatile constituents.

The clear, liquid product obtained is checked by IR spectroscopy for the absence of the ester band at 1711 cm$^{-1}$: no ester band was detected. Yield: 150 g of viscous clear liquid (=94% of the theoretical yield).

Example 19t

In a four-neck flask with stirrer, dropping funnel, thermometer and water separator, 150.3 g of 5-(dimethylamino)-2-methyl-5-oxomethyl pentanoate (0.803 mol) and 54.6 g of meta-xylylenediamine (0.402 mol) are heated at 150° C. with stirring. The methanol produced is separated off on a water separator. The mixture is heated at this temperature for 11 hours. Subsequently at 150° C. a vacuum of 0.8 mbar is applied for 2 hours in order to remove the residual volatile constituents. The clear, liquid product obtained is checked by IR spectroscopy for the absence of the ester band at 1711 cm$^{-1}$: no ester band was detected.

Example 20p

In a four-neck flask with stirrer, dropping funnel, thermometer and water separator, 160.2 g of 5-(dimethylamino)-2-methyl-5-oxomethyl pentanoate (0.856 mol) and 44.2 g of diethylenetriamine (0.428 mol) are heated at 180° C. with stirring. The methanol produced is separated off on a water separator. The mixture is heated at this temperature for 15 hours. It is then cooled to 150° C. and at this temperature a vacuum of 0.8 mbar is applied for 2 hours to remove the residual volatile constituents. The clear, liquid product obtained is checked by IR spectroscopy for the absence of the ester band at 1711 cm$^{-1}$: no ester band was detected. Yield: 168 g of solid product (=95% of the theoretical yield).

After the end of the reaction, the water of reaction formed was removed by distillation on a rotary evaporator. Pale yellow liquid with an amine number of 4 mg KOH/g was obtained.

Composition K1:
Stage 1

First of all 64.4 g of a diisocyanate monoadduct are prepared in accordance with patent specification EP 1188779 from a polyethylene glycol monobutyl ether having a hydroxyl number of 220 mg KOH/g (determined according to DIN/ISO 4629) and a mixture of 35% 2,4-tolylene diisocyanate and 65% 2,6-tolylene diisocyanate.

Stage 2

A four-neck flask is provided with stirrer, dropping funnel, thermometer, and reflux condenser. It is charged with 118.2 g of the reaction product from example 1b, which is heated under a nitrogen atmosphere with stirring to 120° C. 4.2 g of lithium chloride are added and at this temperature are dissolved with stirring in one hour. Temperature is then lowered to 80° C. 10.2 g of m-xylylenediamine are added and the mixture is homogenized.

The isocyanate adduct prepared beforehand (stage 1) is added dropwise with stirring over the course of 1 hour to the amine solution at a slow rate such that the temperature does not exceed 85° C. To complete the reaction, the reaction mixture is stirred at 80° C. for a further three hours. The amine number is 3.6 mg KOH/g (determined according to DIN 16945). The product is a liquid of high viscosity and contains 38 wt % of the urea compound.

Composition K2:
Stage 1

First of all 64.4 g of a diisocyanate monoadduct are prepared in accordance with patent specification EP 1188779 from a polyethylene glycol monobutyl ether having a hydroxyl number of 220 mg KOH/g (determined according to DIN/ISO 4629) and a mixture of 35% 2,4-tolylene diisocyanate and 65% 2,6-tolylene diisocyanate.

Stage 2

A four-neck flask is provided with stirrer, dropping funnel, thermometer, and reflux condenser. It is charged with 188 g of the reaction product from example 8b, which is heated under a nitrogen atmosphere with stirring to 120° C. 5.1 g of lithium chloride are added and at this temperature are dissolved with stirring in one hour. Temperature is then lowered to 80° C. 10.2 g of m-xylylenediamine are added and the mixture is homogenized.

The isocyanate adduct prepared beforehand (stage 1) is added dropwise with stirring over the course of 1 hour to the amine solution at a slow rate such that the temperature does not exceed 85° C. To complete the reaction, the reaction mixture is stirred at 80° C. for a further three hours. A cloudy, colorless, and slightly viscous product is obtained. The amine number is 3 mg KOH/g (determined according to DIN 16945). The product contains 28 wt % of the urea compound.

Composition K3:
Stage 1

First of all 64.4 g of a monoadduct are prepared in accordance with patent specification EP 1188779 from a polyethylene glycol monomethyl ether having a molar mass of 450 g/mol and a mixture of 35% 2,4-tolylene diisocyanate and 65% 2,6-tolylene diisocyanate.

Stage 2

In a four-neck flask with stirrer, dropping funnel, thermometer, and reflux condenser, 187.8 g of the reaction product from example 7b are heated to 100° C. and, when the temperature is reached, 5.9 g of lithium chloride are added. The lithium chloride is thereafter dissolved with stirring at 100° C. within one hour. The temperature is then lowered to 80° C.

10.2 g of m-xylylenediamine are added and the mixture is homogenized.

The isocyanate adduct prepared beforehand (stage 1) is added dropwise with stirring over the course of 1 hour to the amine solution at a slow rate such that the temperature does not exceed 85° C. To complete the reaction, the reaction mixture is stirred at 80° C. for three hours. A brownish and waxlike product is obtained which is liquid at 80° C. The product contains 28 wt % of the urea compound.

Composition K4:
Stage 1
First of all 64.4 g of a monoadduct are prepared in accordance with patent specification EP 1188779 from a polyethylene glycol monomethyl ether having a molar mass of 450 g/mol and a mixture of 35% 2,4-tolylene diisocyanate and 65% 2,6-tolylene diisocyanate.
Stage 2
In a four-neck flask with stirrer, dropping funnel, thermometer, and reflux condenser, 187.8 g of the reaction product from example 11b are heated to 100° C. and, when the temperature is reached, 4.2 g of lithium chloride are added. The lithium chloride is thereafter dissolved with stirring at 100° C. within one hour. The temperature is then lowered to 80° C.

10.2 g of m-xylylenediamine are added and the mixture is homogenized.

The isocyanate adduct prepared beforehand (stage 1) is added dropwise with stirring over the course of 1 hour to the amine solution at a slow rate such that the temperature does not exceed 85° C. To complete the reaction, the reaction mixture is stirred at 80° C. for three hours. A cloudy and viscous product is obtained. The product contains 28 wt % of the urea compound.

Composition K5:
Stage 1
First of all 64.4 g of a diisocyanate monoadduct are prepared in accordance with patent specification EP 1188779 from a polyethylene glycol monobutyl ether having a hydroxyl number of 220 mg KOH/g (determined according to DIN/ISO 4629) and a mixture of 35% 2,4-tolylene diisocyanate and 65% 2,6-tolylene diisocyanate.
Stage 2
A four-neck flask is provided with stirrer, dropping funnel, thermometer, and reflux condenser. It is charged with 239.1 g of a mixture of the reaction product from example 15b, which is heated under a nitrogen atmosphere with stirring to 120° C. 5.1 g of lithium chloride are added and at this temperature are dissolved with stirring in one hour. Temperature is then lowered to 80° C. 10.2 g of m-xylylenediamine are added and the mixture is homogenized.

The isocyanate adduct prepared beforehand (stage 1) is added dropwise with stirring over the course of 1 hour to the amine solution at a slow rate such that the temperature does not exceed 85° C. To complete the reaction, the reaction mixture is stirred at 80° C. for a further three hours. A cloudy and viscous product is obtained. The product contains 23 wt % of the urea compound.

Composition K6:
Stage 1
First of all 64.4 g of a diisocyanate monoadduct are prepared in accordance with patent specification EP 1188779 from a polyethylene glycol monobutyl ether having a hydroxyl number of 220 mg KOH/g (determined according to DIN/ISO 4629) and a mixture of 35% 2,4-tolylene diisocyanate and 65% 2,6-tolylene diisocyanate.
Stage 2
A four-neck flask is provided with stirrer, dropping funnel, thermometer, and reflux condenser. It is charged with 31.2 g of the reaction product from example 14b, which is heated under a nitrogen atmosphere with stirring to 120° C. 0.7 g of lithium chloride is added and at this temperature is dissolved with stirring in one hour. Temperature is then lowered to 80° C. 3.0 g of m-xylylenediamine are added and the mixture is homogenized.

17.1 g of the isocyanate adduct prepared in stage 1 are added dropwise with stirring over the course of 1 hour to the amine solution at a slow rate such that the temperature does not exceed 85° C. To complete the reaction, the reaction mixture is stirred at 80° C. for a further three hours. The product contains 39 wt % of the urea compound.

Composition K7:
Stage 1
First of all a monoadduct is prepared in accordance with patent specification EP 1188779 from 2,4-tolylene diisocyanate (Desmodur T100, Bayer) and 1-dodecanol.
Stage 2
In a reaction vessel (round-bottom flask with stirrer, reflux condenser, and dropping funnel), under a nitrogen atmosphere and with stirring, 12.6 g (0.3 mol) of LiCl are dissolved in 280 g of the reaction product from example 1b. Then 13.6 g (0.125 mol) of meta-xylylenediamine are added and the clear mixture is heated to 80° C. Subsequently 72.0 g (0.20 mol) of the isocyanate adduct described (stage 1) are added dropwise with stirring over the course of 1 hour at a rate such that the temperature does not exceed 85° C. To complete the reaction, the reaction mixture is stirred at 80° C. for 3 hours. A clear and viscous product is obtained. The fraction of the urea compound in the resulting product is 23 wt %.

Composition K8:
Stage 1
First of all 93.6 g of a monoadduct are prepared in accordance with patent specification EP 1188779 from a polyethylene glycol monomethyl ether having a molar mass of 450 g/mol and a mixture of 35% 2,4-tolylene diisocyanate and 65% 2,6-tolylene diisocyanate.
Stage 2
In a four-neck flask with stirrer, dropping funnel, thermometer, and reflux condenser, 162.0 g of the reaction product from example 1b are heated to 100° C. and, when the temperature is reached, 4.2 g of lithium chloride are added. The lithium chloride is thereafter dissolved with stirring at 100° C. within one hour. The temperature is then lowered to 80° C.

10.2 g of m-xylylenediamine are added and the mixture is homogenized.

The isocyanate adduct prepared beforehand (stage 1) is added dropwise with stirring over the course of 1 hour to the amine solution at a slow rate such that the temperature does not exceed 85° C. To complete the reaction, the reaction mixture is stirred at 80° C. for three hours. A viscous, brownish product is obtained. The product contains 38 wt % of urea compound.

Composition K9:
Stage 1
First of all 93.6 g of a monoadduct are prepared in accordance with patent specification EP 1188779 from a polyethylene glycol monomethyl ether having a molar mass of 450 g/mol and a mixture of 35% 2,4-tolylene diisocyanate and 65% 2,6-tolylene diisocyanate.
Stage 2
In a four-neck flask with stirrer, dropping funnel, thermometer, and reflux condenser, 252.0 g of the reaction product from example 14b are heated to 100° C. and, when the temperature is reached, 4.2 g of lithium chloride are added. The lithium chloride is thereafter dissolved with stirring at 100° C. within one hour. The temperature is then lowered to 80° C.

10.2 g of m-xylylenediamine are added and the mixture is homogenized.

The isocyanate adduct prepared beforehand (stage 1) is added dropwise with stirring over the course of 1 hour to the amine solution at a slow rate such that the temperature does not exceed 85° C. To complete the reaction, the reaction mixture is stirred at 80° C. for three hours. A cloudy, brownish product is obtained. The amine number is 3 mg KOH/g (determined according to DIN 16945). The product contains 29 wt % of urea compound.

Composition K10:

Stage 1

First of all 93.6 g of a monoadduct are prepared in accordance with patent specification EP 1188779 from a polyethylene glycol monomethyl ether having a molar mass of 450 g/mol and a mixture of 35% 2,4-tolylene diisocyanate and 65% 2,6-tolylene diisocyanate.

Stage 2

In a four-neck flask with stirrer, dropping funnel, thermometer, and reflux condenser, 324.0 g of the reaction product from example 16b are heated to 100° C. and, when the temperature is reached, 4.2 g of lithium chloride are added. The lithium chloride is thereafter dissolved with stirring at 100° C. within one hour. The temperature is then lowered to 80° C.

10.2 g of m-xylylenediamine are added and the mixture is homogenized.

The isocyanate adduct prepared beforehand (stage 1) is added dropwise with stirring over the course of 1 hour to the amine solution at a slow rate such that the temperature does not exceed 85° C. To complete the reaction, the reaction mixture is stirred at 80° C. for three hours. A brownish product is obtained. The product contains 24 wt % of urea compound.

COMPARATIVE EXAMPLES (NOT INVENTIVE)

Comparative Example C1

Stage 1

First of all 64.4 g of a diisocyanate monoadduct are prepared in accordance with patent specification EP 1188779 from a polyethylene glycol monobutyl ether having a hydroxyl number of 220 mg KOH/g (determined according to DIN/ISO 4629) and a mixture of 35% 2,4-tolylene diisocyanate and 65% 2,6-tolylene diisocyanate.

Stage 2

A four-neck flask is provided with stirrer, dropping funnel, thermometer, and reflux condenser. It is charged with 72.7 g of 1-ethylpyrrolidin-2-one, which is heated under a nitrogen atmosphere with stirring to 120° C. 4.2 g of lithium chloride are added and at this temperature are dissolved with stirring in one hour.

Temperature is then lowered to 80° C. 10.2 g of m-xylylenediamine are added and the mixture is homogenized.

The isocyanate adduct prepared beforehand (stage 1) is added dropwise with stirring over the course of 1 hour to the amine solution at a slow rate such that the temperature does not exceed 85° C. To complete the reaction, the reaction mixture is stirred at 80° C. for a further three hours. A clear, yellow product is obtained. The amine number is 1 mg KOH/g (determined according to DIN 16945). The product contains 49 wt % of the urea compound.

Comparative Example C2

Stage 1

First of all 64.4 g of a diisocyanate monoadduct are prepared in accordance with patent specification EP 1188779 from a polyethylene glycol monobutyl ether having a hydroxyl number of 220 mg KOH/g (determined according to DIN/ISO 4629) and a mixture of 35% 2,4-tolylene diisocyanate and 65% 2,6-tolylene diisocyanate.

Stage 2

A four-neck flask is provided with stirrer, dropping funnel, thermometer, and reflux condenser. It is charged with 72.7 g of dimethyl sulfoxide, which is heated under a nitrogen atmosphere with stirring to 120° C. 4.2 g of lithium chloride are added and at this temperature are dissolved with stirring in one hour. Temperature is then lowered to 80° C. 10.2 g of m-xylylenediamine are added and the mixture is homogenized.

The isocyanate adduct prepared beforehand (stage 1) is added dropwise with stirring over the course of 1 hour to the amine solution at a slow rate such that the temperature does not exceed 85° C. To complete the reaction, the reaction mixture is stirred at 80° C. for a further three hours. A clear, yellow product is obtained. The amine number is 1 mg KOH/g (determined according to DIN 16945). The product contains 49 wt % of the urea compound.

Comparative Example C3

Stage 1

First of all 64.4 g of a diisocyanate monoadduct are prepared in accordance with patent specification EP 1188779 from a polyethylene glycol monobutyl ether having a hydroxyl number of 220 mg KOH/g (determined according to DIN/ISO 4629) and a mixture of 35% 2,4-tolylene diisocyanate and 65% 2,6-tolylene diisocyanate.

Stage 2

A four-neck flask is provided with stirrer, dropping funnel, thermometer, and reflux condenser. It is charged with 72.7 g of N-methylpyrrolidone, which is heated under a nitrogen atmosphere with stirring to 120° C. 4.2 g of lithium chloride are added and at this temperature are dissolved with stirring in one hour. Temperature is then lowered to 80° C. 10.2 g of m-xylylenediamine are added and the mixture is homogenized.

The isocyanate adduct prepared beforehand (stage 1) is added dropwise with stirring over the course of 1 hour to the amine solution at a slow rate such that the temperature does not exceed 85° C. To complete the reaction, the reaction mixture is stirred at 80° C. for a further three hours. A clear, yellow product is obtained. The product contains 49 wt % of the urea compound.

Comparative Example C4

First of all a monoadduct is prepared in accordance with patent specification EP 1188779 from 2,4-tolylene diisocyanate (Desmodur T100, Bayer) and lauryl alcohol. In a reaction vessel (round-bottom flask with stirrer, reflux condenser, and dropping funnel), under a nitrogen atmosphere and with stirring, 1.7 (0.039 mol) of LiCl are dissolved in 75 g of N-methylpyrrolidone (commercial product). Then 3.6 g (0.026 mol) of meta-xylylenediamine are added and the clear mixture is heated to 80° C. Subsequently 19.8 g (0.052 mol) of the monoadduct of Desmodur T100 and lauryl alcohol are added dropwise with stirring over the course of 1 hour at a rate such that the temperature does not exceed 85° C. To complete the reaction, the reaction mixture is stirred at 80° C. for 3 hours. A clear and liquid product is obtained. The fraction of the urea compound in the resulting product is 23 wt %.

Comparative Example C5

First of all a monoadduct is prepared in accordance with patent specification EP 1188779 from 2,4-tolylene diisocyanate (Desmodur T100, Bayer) and lauryl alcohol. In a reaction vessel (round-bottom flask with stirrer, reflux condenser, and dropping funnel), under a nitrogen atmosphere and with stirring, 1.7 g (0.039 mol) of LiCl are dissolved in 75 g of 1-N-ethylpyrrolidone (commercial product). Then 3.6 g (0.026 mol) of meta-xylylenediamine are added and the clear mixture is heated to 80° C. Subsequently 19.8 g (0.052 mol) of the monoadduct of Desmodur T100 and lauryl alcohol are added dropwise with stirring over the course of 1 hour at a rate such that the temperature does not exceed 85° C. To complete the reaction, the reaction mixture is stirred at 80° C. for 3 hours. A clear and low-viscosity product is obtained. The fraction of the urea compound in the resulting product is 23 wt %.

Comparative Example C6

Stage 1
First of all 93.6 g of a monoadduct are prepared in accordance with patent specification EP 1188779 from a polyethylene glycol monomethyl ether having a molar mass of 450 g/mol and a mixture of 35% 2,4-tolylene diisocyanate and 65% 2,6-tolylene diisocyanate.
Stage 2
In a four-neck flask with stirrer, dropping funnel, thermometer, and reflux condenser, 99.7 g of N-methylpyrrolidone (commercial product, BASF) are heated to 100° C. and, when the temperature is reached, 4.2 g of lithium chloride are added. The lithium chloride is thereafter dissolved with stirring at 100° C. within one hour. The temperature is then lowered to 80° C.
10.2 g of m-xylylenediamine are added and the mixture is homogenized.
The isocyanate adduct prepared beforehand (stage 1) is added dropwise with stirring over the course of 1 hour to the amine solution at a slow rate such that the temperature does not exceed 85° C. To complete the reaction, the reaction mixture is stirred at 80° C. for three hours. A clear, yellowish product is obtained. The product contains 48 wt % of urea compound.

Comparative Example C7

Stage 1
First of all 93.6 g of a monoadduct are prepared in accordance with patent specification EP 1188779 from a polyethylene glycol monomethyl ether having a molar mass of 450 g/mol and a mixture of 35% 2,4-tolylene diisocyanate and 65% 2,6-tolylene diisocyanate.
Stage 2
In a four-neck flask with stirrer, dropping funnel, thermometer, and reflux condenser, 132.0 g of dimethyl sulfoxide (commercial product from Sigma Aldrich) are heated to 100° C. and, when the temperature is reached, 4.2 g of lithium chloride are added. The lithium chloride is thereafter dissolved with stirring at 100° C. within one hour. The temperature is then lowered to 80° C.
10.2 g of m-xylylenediamine are added and the mixture is homogenized.
The isocyanate adduct prepared beforehand (stage 1) is added dropwise with stirring over the course of 1 hour to the amine solution at a slow rate such that the temperature does not exceed 85° C. To complete the reaction, the reaction mixture is stirred at 80° C. for three hours. A clear, yellowish product is obtained. The product contains 43 wt % of urea compound.

Comparative Example C8

Stage 1
First of all 93.6 g of a monoadduct are prepared in accordance with patent specification EP 1188779 from a polyethylene glycol monomethyl ether having a molar mass of 450 g/mol and a mixture of 35% 2,4-tolylene diisocyanate and 65% 2,6-tolylene diisocyanate.
Stage 2
In a four-neck flask with stirrer, dropping funnel, thermometer, and reflux condenser, 99.7 g of N-ethylpyrrolidone (commercial product, BASF) are heated to 100° C. and, when the temperature is reached, 4.2 g of lithium chloride are added. The lithium chloride is thereafter dissolved with stirring at 100° C. within one hour. The temperature is then lowered to 80° C.
10.2 g of m-xylylenediamine are added and the mixture is homogenized.
The isocyanate adduct prepared beforehand (stage 1) is added dropwise with stirring over the course of 1 hour to the amine solution at a slow rate such that the temperature does not exceed 85° C. To complete the reaction, the reaction mixture is stirred at 80° C. for three hours. A clear, yellowish product is obtained. The product contains 50 wt % of urea compound.

Comparative Example C11

Stage 1
First of all 64.4 g of a diisocyanate monoadduct are prepared in accordance with patent specification EP 1188779 from a polyethylene glycol monobutyl ether having a hydroxyl number of 220 mg KOH/g (determined according to DIN/ISO 4629) and a mixture of 35% 2,4-tolylene diisocyanate and 65% 2,6-tolylene diisocyanate.
Stage 2
A four-neck flask is provided with stirrer, dropping funnel, thermometer, and reflux condenser. It is charged with 118.2 g of methyl 5-(dimethylamino)-2-methyl-5-oxopentanoate, which is heated under a nitrogen atmosphere with stirring to 120° C. 4.2 g of lithium chloride are added and at this temperature are dissolved with stirring in one hour. Temperature is then lowered to 80° C. 10.2 g of m-xylylenediamine are added and the mixture is homogenized.
The isocyanate adduct prepared beforehand (stage 1) is added dropwise with stirring over the course of 1 hour to the amine solution at a slow rate such that the temperature does not exceed 85° C. To complete the reaction, the reaction mixture is stirred at 80° C. for a further three hours. A clear, yellow product is obtained. The amine number is 1 mg KOH/g (determined according to DIN 16945). The product contains 38 wt % of the urea compound.

Comparative Example C12

Stage 1
First of all 64.4 g of a diisocyanate monoadduct are prepared in accordance with patent specification EP 1188779 from a polyethylene glycol monobutyl ether having a hydroxyl number of 220 mg KOH/g (determined according to DIN/ISO 4629) and a mixture of 35% 2,4-tolylene diisocyanate and 65% 2,6-tolylene diisocyanate.
Stage 2
A four-neck flask is provided with stirrer, dropping funnel, thermometer, and reflux condenser. It is charged with 118.2 g of 1-(morpholine-4-yl)ethanone, which is heated under a nitrogen atmosphere with stirring to 120° C. 4.2 g of lithium chloride are added and at this temperature are dissolved with stirring in one hour.

Temperature is then lowered to 80° C. 10.2 g of m-xylylenediamine are added and the mixture is homogenized.

The isocyanate adduct prepared beforehand (stage 1) is added dropwise with stirring over the course of 1 hour to the amine solution at a slow rate such that the temperature does not exceed 85° C. To complete the reaction, the reaction mixture is stirred at 80° C. for a further three hours. A clear, yellow product is obtained. The amine number is 1 mg KOH/g (determined according to DIN 16945). The product contains 38 wt % of the urea compound.

Comparative Example C13: Combination of Noninventive Amide Compounds with Urea Compounds For the following combination experiments, in analogy to WO 2011/091812, BYK-430 (30% strength solution of a high-molecular modified polyamide, from BYK-Chemie GmbH) is used as noninventive amide compound. This amide component was combined with various urea compounds in accordance with comparative examples above (i.e., dissolved urea compounds containing no inventive amide component as a mixing constituent). Mixing was carried out with continuous stirring.

| Ex. | Urea solution | Weight ratio of urea solution to BYK-430 | Appearance of the combination |
|---|---|---|---|
| C13-1 | C3 (410) | 7:3 | slightly cloudy, gelled |
| C13-2 | C3 (410) | 5:5 | slightly cloudy, gelled |
| C13-3 | C3 (410) | 3:7 | very cloudy, gelled |
| C13-4 | C6 (420) | 7:3 | slightly cloudy, gelled |
| C13-5 | C6 (420) | 5:5 | cloudy, gelled |
| C13-6 | C6 (420) | 3:7 | cloudy, gelled |

The example shows that the compositions of the invention ensure high compatibility of the relevant urea and amide components, leading to ease of preparation combined with good storage stability of the rheologically active compositions comprising amide and urea, whereas the noninventive amide compounds do not enable a storage-stable combination and therefore also do not enable easy handling as a whole composition. In the case of the noninventive combinations, therefore, incorporation into the system must always take place separately, meaning that more worksteps and therefore extra production effort and complexity are required.

Performance Testing of the Compositions Suitable as Rheology Additives

Test System 1: Solvent Mixture of n-Butyl Acetate and Methoxypropanol

For this series of tests an amount of the urea compound of 28 wt % in the additive composition is set for all of the products tested, by the addition to the composition—where necessary—of a further quantity of the respective amide compound. In a 100 ml glass bottle, 50 g of the solvent mixture n-butyl acetate/Dowanol PM 75:25 (w/w) are introduced, and then the respective additive composition is added in an amount corresponding to 0.5 wt % of the urea compound. This incorporation takes place with stirring with the Dispermat CV (toothed disk d=2.5 cm at 1000 rpm). The addition is followed by a further minute of stirring. The samples are then left to stand at RT for one hour, after which a visual appraisal is made of the gel strength, as a measure of the rheological activity, and of the clouding, for the compatibility of the additive.

Evaluation Scale:

| Gel strength: | 1 | very strong |
|---|---|---|
| | 2 | strong |
| | 3 | moderate |
| | 4 | very weak |
| | 5 | no gel |
| Cloudiness (compatibility): | 1 | clear |
| | 2 | slightly cloudy |
| | 3 | cloudy |
| | 4 | very cloudy |
| | 5 | extremely cloudy |

Results:

| Composition (each containing 28 wt % of urea) | Gel strength | Cloudiness |
|---|---|---|
| Control | 5 | 1 |
| Comparative Ex. C1 | 4 | 2 |
| K1 | 3 | 1 |
| K2 | 3 | 1 |
| K4 | 4 | 1 |
| K3 | 4 | 1 |
| K6 | 3 | 2 |

From the results it is evident that the inventive compositions in comparison to comparative example C1 permit either better compatibility (i.e., less cloudiness in the system) or the development of a greater gel strength (i.e., better rheological activity) or exhibit both advantageous effects in combination.

Test System 2: Setalux D A 870 BA Clear Coat

For this series of tests an amount of the urea compound of 28 wt % in the additive composition is set for all of the products tested, by the addition to the composition—where necessary—of a further quantity of the respective amide compound. In a 100 ml glass bottle, 50 g of Setalux D A 870 BA clear coat are introduced and then the respective additive is incorporated with stirring using the Dispermat CV (toothed disk d=2.5 cm at 1000 rpm). The amount of the additive composition is selected in each case to correspond to 0.4 wt %, relative to the urea compound. The addition is followed by stirring for a further minute.

The samples are then left to stand at RT for one day, after which they are first appraised visually for the gel strength, as a measure of the rheological activity, and for cloudiness, for the compatibility of the additive. This is followed by testing of the sag resistance, as a measure of the rheological activity under application conditions.

For this purpose, the sample is stirred evenly with a spatula and then applied to contrast charts using the 30-300 μm stepped doctor and an automatic applicator from BYK Gardner, at a speed of 5 cm/s. Following application, the contrast charts are hung up directly, in horizontal position, for drying. After drying has taken place, a determination is made of the wet film thickness, in μm, at which the coating does not run, meaning that no runs or fat edging are apparent. The higher the figure for the sag resistance for a given active substance employed, the better the rheological activity.

Coating Formulation (Parts by Weight):

|  |  |
|---|---|
| Setalux D A 870 BA | 80.0 |
| Butyl acetate | 9.9 |
| Dowanol PMA | 9.9 |
| BYK-066 | 0.2 |

Results:

| Composition (each containing 28 wt % of urea) | Gel strength | Cloudiness | Sag resistance μm wet |
|---|---|---|---|
| Control | 5 | 1 | 30 |
| Comparative Ex. C3 | 2 | 2 | 90 |
| K1 | 1 | 1 | 150 |
| K2 | 1 | 2 | 450 |
| K4 | 2 | 1 | 200 |
| K3 | 1-2 | 2 | 400 |

From the results it is apparent that the inventive compositions in comparison to comparative example C3 allow either better compatibility (i.e., less cloudiness in the system) or the development of a greater gel strength and also an improved sag resistance (i.e., maximum possible film thickness) or exhibit the advantageous effects in combination.

Test System 3: Epikote 1001-X75—Clear Coat

For this series of tests an amount of the urea compound of 38 wt % in the additive composition is set for all of the products tested, by the addition to the composition—where necessary—of a further quantity of the respective amide compound. In a 100 ml glass bottle, 50 g of Epikote 1001-X75 clear coat are introduced and then the respective additive is incorporated with stirring using the Dispermat CV (toothed disk d=2.5 cm at 1000 rpm). The amount selected in each case corresponds to 0.8 wt % of the urea compound. The addition is followed by stirring for a further minute. The samples are then left to stand at RT for one day, after which they are first appraised visually for the gel strength, as a measure of the rheological activity, and for cloudiness, for the compatibility of the additive. This is followed by testing of the sag resistance, as a measure of the rheological activity under application conditions.

For this purpose, the sample is stirred evenly with a spatula and then applied to contrast charts using the 30-300 μm stepped doctor and an automatic applicator from BYK Gardner, at a speed of 5 cm/s. Following application, the contrast charts are hung up directly, in horizontal position, for drying. After drying has taken place, a determination is made of the wet film thickness, in μm, at which the coating does not run, meaning that no runs or fat edging are apparent. The higher the figure for the sag resistance for a given active substance employed, the better the rheological activity.

Coating Formulation (Parts by Weight):

|  |  |
|---|---|
| Epikote 1001-X75 | 75.3 |
| Methyl isobutyl ketone | 17.3 |
| Isobutanol | 7.4 |

Results:

| Composition (each containing 38 wt % of urea) | Gel strength | Cloudiness | Sag resistance μm wet |
|---|---|---|---|
| Control | 5 | 1 | <50 |
| Comparative Ex. C3 | 3 | 1 | 200 |
| K1 | 2 | 1 | 300 |

From the results it is apparent that the inventive composition in comparison to comparative example C3, while having equally good compatibility, permits a greater gel strength and also an improved sag resistance (i.e., maximum possible film thickness).

Test System 4: Worleekyd S 351 Binder

In a 100 ml glass bottle, 50 g of Worleekyd S 351 binder are introduced and then the respective additive is incorporated with stirring using the Dispermat CV (toothed disk d=2.5 cm at 1000 rpm). The amount selected in each case corresponds to 0.7 wt % of the urea compound. The addition is followed by stirring for a further minute.

The samples are then left to stand at RT for one day, after which an assessment is made of the sag resistance, as a measure of the rheological activity under application conditions. For this purpose, the sample is stirred evenly with a spatula and then applied to contrast charts using the 50-500 μm stepped doctor and an automatic applicator from BYK Gardner, at a speed of 5 cm/s. Following application, the contrast charts are hung up directly, in horizontal position, for drying. After drying has taken place, a determination is made of the wet film thickness, in μm, at which the coating does not run, meaning that no runs or fat edging are apparent. The higher the figure for the sag resistance for an identical active substance employed, the better the rheological activity.

Results:

| Composition (each containing 23 wt % of urea) | Gel strength | Cloudiness | Sag resistance μm wet |
|---|---|---|---|
| Control | 5 | 1 | <50 |
| Comparative Ex. C4 | 3 | 3 | 300 |
| Comparative Ex. C5 | 3-4 | 3 | 350 |
| K7 | 1 | 2 | 450 |

From the results it is apparent that the inventive composition in comparison to comparative examples C4 and C5, while having equally improved compatibility, permits a greater gel strength and also an improved sag resistance (i.e., maximum possible film thickness).

Test System 5: Worleekyd S 366 Clear Coat

In a 100 ml glass bottle, 50 g of Worleekyd S 366 clear coat are introduced and then the respective additive is incorporated with stirring using the Dispermat CV (toothed disk d=2.5 cm at 1000 rpm). The amount selected in each case corresponds to 0.5 wt % of the urea compound. The addition is followed by stirring for a further minute. The samples are then left to stand at RT for one day, after which an assessment is made of the sag resistance, as a measure of the rheological activity under application conditions.

For this purpose, the sample is stirred evenly with a spatula and then applied to contrast charts using the 50-500 μm stepped doctor and an automatic applicator from BYK Gardner, at a speed of 5 cm/s. Following application, the contrast charts are hung up directly, in horizontal position, for drying. After drying has taken place, a determination is made of the wet film thickness, in μm, at which the coating does not run, meaning that no runs or fat edging are apparent. The higher the figure for the sag resistance for a given active substance employed, the better the rheological activity.

Coating Formulation (Parts by Weight):

| | |
|---|---|
| Worléekyd S 366 60% in Isopar H | 80.9 |
| Isopar H | 16.0 |
| Nuodex Combi APB | 2.6 |
| Borchi Nox M 2 | 0.3 |
| BYK-066 | 0.2 |

Results:

| Composition (each containing 23 wt % of urea) | Gel strength | Sag resistance μm wet |
|---|---|---|
| Control | 5 | 50 |
| Comparative Ex. C4 | 3-4 | 150 |
| K7 | 1 | 300 |

From the results it is apparent that the inventive composition in comparison to comparative example C4, permits a significantly increased gel strength and also improved sag resistance (i.e., maximum possible film thickness).

Test System 6: Polystyrene Palapreg P17-02/Palapreg H 814-01

In a 175 ml PE beaker, first of all the two resin components Palapreg P17-02 and Palapreg H 814-01 are homogenized with the Dispermat CV, with a 4 cm toothed disk, at 1200 rpm for one minute. 50 g of this mixture are then placed in a 175 ml PE beaker, and the respective additive is incorporated with stirring using the Dispermat CV (toothed disk d=2.5 cm at 1000 rpm). The amount selected in each case is that corresponding to 0.8 wt % of the urea compound. Following addition, stirring is continued for two minutes more.

The samples are then introduced directly into 50 ml snap-on lid bottles, and left to stand at RT. After three days, the separation of the samples is assessed, in percent relative to the total amount introduced, and there is also visual evaluation of the gel strength, as a measure of the rheological activity. The lower the separation of the samples, the better the rheological activity of the samples. Besides the rheological activity, color influence by the additive on the formulation also plays a part, and must be as small as possible. At the same time, a high boiling point of the amide compound is relevant for application in the sheet molding compounds sector, since otherwise the ambient air will be polluted when the compounds are subjected to hot pressing, and gas bubbles which form cause unwanted air inclusions in the pressed compound.

Resin Formulation (Parts by Weight):

| | |
|---|---|
| Palapreg P 17-02 | 70 |
| Palapreg H 814-01 | 30 |

Results:

| Composition (each containing 38 wt % of urea) | Gel strength visual | Separation after three days at room temperature % |
|---|---|---|
| Control | | 38 |
| Comparative Ex. C11 | 5 | 37 |
| Comparative Ex. C12 | 5 | 38 |
| K1 | 1 | 0 |

From the results it is apparent that the inventive composition in comparison to comparative examples C11 and C12 has a marked influence on the unwanted phase separation and, by increasing the gel strength, effectively and completely prevents separation.

The invention claimed is:
1. A composition comprising
   i) 15-95 wt % of an amide compound (A),
   ii) 5-75 wt % of a urea compound (B),
   iii) 0-50 wt % of an ionogenic compound (C), and
   iv) 0-35 wt % of an organic solvent (D),
   where the amide compound (A) has a molar mass of 70 to 600 g/mol, the amide compound (A) contains not more than one amide group with hydrogen bonded to its nitrogen atom, the amide compound (A) has no urea group, no phosphorus, no silicon, and no halogen, and the amide compound (A) is present in accordance with the general formula (I),

(I)

where
Xx is identical or different and is represented by an amide group C(=O)—N which is linked to Rz, Ra, and Rb in accordance with one of the general formulae RzC(=O)—NRaRb (Xx1), RaC(=O)—NRzRb (Xx2), and RbC(=O)—NRzRa (Xx3)
Xy is identical or different and is represented by an amide group C(=O)—N which is linked to Rz, Rc, and Rd in accordance with one of the general formulae RzC(=O)—NRcRd (Xy1), RcC(=O)—NRzRd (Xy2), and RdC(=O)—NRzRc (Xy3)
Rz in each case is identical or different and is represented by a branched or unbranched, saturated or unsaturated hydrocarbon radical which has 1 to 32 carbon atoms and which as heteroatom-containing groups may optionally contain exclusively amino groups, amide groups, or mixtures thereof
Ra, Rb, Rc, and Rd, in each case identically or differently and in each case independently of one another, are represented by hydrogen or a branched or unbranched, saturated or unsaturated organic radical containing 1 to 16 carbon atoms, with the proviso that
Ra, Rb, Re, and Rd in their entirety have at least four carbon atoms,
not more than one of the radicals from the group of Ra, Rb, Rc, and Rd is present in the form of hydrogen,
at least one of i) Ra and Rb, together with the CO—N moiety joining Ra to Rb or ii) Re and Rd, together with the CO—N moiety joining Rc to Rd, may optionally together, in accordance with the general formula (α-1), form a cyclic structure having 4 to 10 ring atoms, and

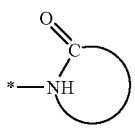
(α-1)

at least one of iii) Ra and Rb, together with the N atom joining Ra to Rb or iv) Rc and Rd, together with the N atom joining Rc to Rd, may optionally together, in accordance with the general formula (β-1), form a cyclic structure having 4 to 7 ring atoms, or

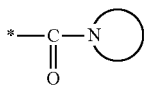

Rb and Rc together with the N atom bonded to each of Rb and Rc, and also with the radical Rz, may optionally, in accordance with the general formula (γ-1), form a cyclic structure having 5 to 7 ring atoms

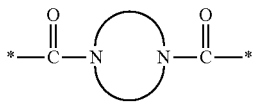
(γ-1)

Ra, Rb, Re, Rd, and Rz in their entirety have not more than 36 carbon atoms and also not more than 8 heteroatoms from the group of N and O, the urea compound (B) has a molecular weight of at least 350 g/mol and at least one urea group, the ionogenic compound (C) contains a cationic component and an anionic component and is different from the amide compound (A) and from the urea compound (B), and the organic solvent (D) contains no urea group and no ionic group and also has not more than two heteroatoms selected from the group consisting of nitrogen and oxygen.

2. The composition as claimed in claim 1, comprising
i) 30-90 wt % of the amide compound (A),
ii) 8-55 wt % of the urea compound (B),
iii) 0-15 wt % of the ionogenic compound (C), and
iv) 2-25 wt % of the organic solvent (D).

3. The composition as claimed in claim 1, characterized in that 50-100 wt % of the amide compound (A) has no amide group with hydrogen bonded to its nitrogen atom.

4. The composition as claimed in claim 3, characterized in that said 50-100 wt % of the amide compound (A) is present in accordance with a general formula (I) in which none of the radicals from the group of Ra, Rb, Rc, and Rd is represented by hydrogen.

5. The composition as claimed in claim 1, characterized in that 50-100 wt % of the amide compound (A) is present in accordance with the general formula (Ia)

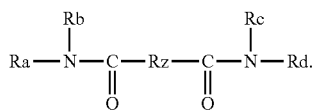
(Ia)

6. The composition as claimed in claim 1, characterized in that 50-100 wt % of the amide compound (A) is present in accordance with the general formula (Ia), where at least one of i) Ra and Rb, together with the N atom joining Ra to Rb or ii) Rc and Rd, together with the N atom joining Rc to Rd, in accordance with the general formula (β-1), together form a branched or unbranched, saturated or unsaturated cyclic structure having 4 to 7 ring atoms which has not more than two heteroatoms from the group consisting of O and N.

7. The composition as claimed in claim 1, characterized in that 50-100 wt % of the amide compound (A) is present in accordance with the general formula (Ia), where i) Ra, Rb, Rc or Rd, or ii) Ra, Rb, Rc and Rd, in each case are not present in cyclic structures.

8. The composition as claimed in claim 1, characterized in that the general formula (I) for 50-100 wt % of the amide compound (A) is present in accordance with the general formula (Ib)

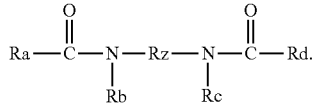

9. The composition as claimed in claim 1, characterized in that the general formula (I) for 50-100 wt % of the amide compound (A) is present in accordance with the general formula (Ib), where Rb and Rc together with the N atom bonded to each of Rb and Rc, and also with the radical Rz, in accordance with the general formula (γ-1), form a branched or unbranched, saturated or unsaturated cyclic structure having 5 to 7 ring atoms which has not more than two heteroatoms from the group consisting of O and N.

10. The composition as claimed in claim 1, characterized in that the general formula (I) for 50-100 wt % of the amide compound (A) is present in accordance with the general formula (Ib), where at least one of i) Ra and Rb, together with the CO—N moiety joining Ra to Rb or ii) Rc and Rd, together with the CO—N moiety joining Rc to Rd, in accordance with the general formula (α-1), together form a branched or unbranched, saturated or unsaturated cyclic structure having 4 to 10 ring atoms which has not more than two heteroatoms from the group consisting of O and N.

11. The composition as claimed in claim 1, characterized in that 70-100 wt % of the urea compound (B) either has at least two urea groups or has at least one urea group and at least one urethane group.

12. The composition as claimed in claim 1, characterized in that 50-100 wt % of the urea compound (B) is present in accordance with the general formula (II)

where
$R^{31}$ and $R^{32}$ each identically or differently and also each independently of one another are represented by a branched or unbranched, saturated or unsaturated organic radical which contains 1-100 carbon atoms and which has not more than one urea group each and not more than one urethane group each, $R^{33}$ and $R^{34}$ each identically or differently and also each independently of one another are represented by branched or unbranched polyester radicals containing 1-300 carbon atoms and optionally containing ether groups, branched or unbranched polyether radicals containing 2-300 carbon atoms, branched or unbranched polyamide radicals containing 1-300 carbon atoms, polysiloxane radicals containing 3 to 100 silicon atoms, branched or unbranched C2-C22 alkylene radicals, branched or unbranched C3-C18 alkenylene radicals, C5-C12 arylene radicals, or branched or unbranched C7-C22 arylalkylene radicals, Z and W each identically or differently and also each independently of one another are represented by NH—CO—O or NH—CO—NH, n is in each case identical or different and is represented by an integer from 1 to 150.

13. The composition as claimed in claim 1, characterized in that 50-100 wt % of the urea compound (B) has a molecular weight of 2000 to 55000 and also 4-150 urea groups.

14. The composition as claimed in claim 1, characterized in that 50-100 wt % of the urea compound (B) is present in accordance with one of the general formulae selected from the group consisting of (IIIa), (IIIb), (IIIc), and (IIId)

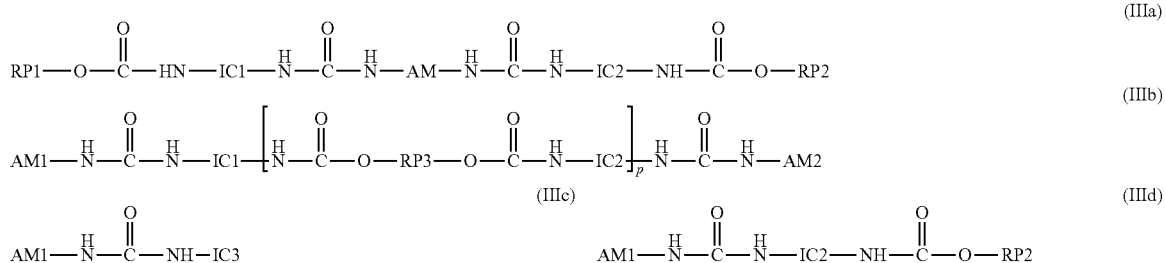

where

AM is identical or different and is represented by a linear or branched, saturated or unsaturated, aliphatic, aromatic or aliphatic-aromatic organic radical having 2 to 50 carbon atoms, AM1 and AM2 are identical or different and independently of one another represented by a linear or branched, saturated or unsaturated, aliphatic, aromatic or aliphatic-aromatic organic radical having 1 to 50 carbon atoms, IC1 and IC2 are identical or different and independently of one another represented by a linear or branched, saturated or unsaturated, aliphatic, aromatic or aliphatic-aromatic hydrocarbon radical having 2 to 40 carbon atoms, IC3 is identical or different and is represented by a linear or branched, saturated or unsaturated, aliphatic, aromatic or aliphatic-aromatic hydrocarbon radical having 2 to 24 carbon atoms, RP1 and RP2 are identical or different and independently of one another represented by a linear or branched, saturated or unsaturated, aliphatic, aromatic or aliphatic-aromatic organic radical having 1 to 24 carbon atoms or by a polyether radical having 1 to 120 ether oxygen atoms or by a polyester radical having 1 to 100 ester groups and optionally containing ether groups, or by a polyamide radical having 1 to 100 amide groups, or by a polysiloxane radical having 3 to 100 silicon atoms, RP3 is identical or different and is represented by a linear or branched, saturated or unsaturated, aliphatic, aromatic or aliphatic-aromatic hydrocarbon radical having 2 to 24 carbon atoms or by a (poly)ether radical having 1 to 120 ether oxygen atoms or by a polyamide radical having 1 to 100 amide groups or by a polysiloxane radical having 3 to 100 silicon atoms or by a polyester radical having 1 to 100 ester groups and optionally containing ether groups, and p is identical or different and is represented by 0 or 1.

15. The composition as claimed in claim 14, characterized in that 70-100 wt % of the urea compound (B) is present in each case in accordance with one of the general formulae selected from the group consisting of (IIIa), (IIIb), (IIIb), and (IIId), where AM is identical or different and is selected from the group consisting of

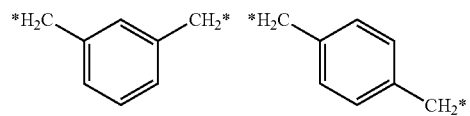

-continued

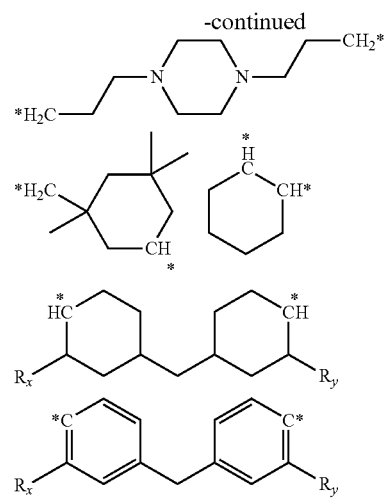

where $R_x$ and $R_y$ are identical or different and are in each case independently represented by $CH_3$ or hydrogen, $(CH_2)_q$ where q is identical or different and is represented by an integer from 2 to 12, AM1 and AM2 are each identical or different and are selected from the group consisting of n-propyl, isopropyl, butyl, isobutyl, tert-butyl, lauryl, oleyl, stearyl, polyisobutylene, and polyethers having 2 to 40 ether oxygen atoms, benzyl, methylbenzyl, cyclohexyl, carboxyalkyl, hydroxyalkyl, and alkylalkoxysilane, IC1 and IC2 are each identical or different and are selected from the group consisting of

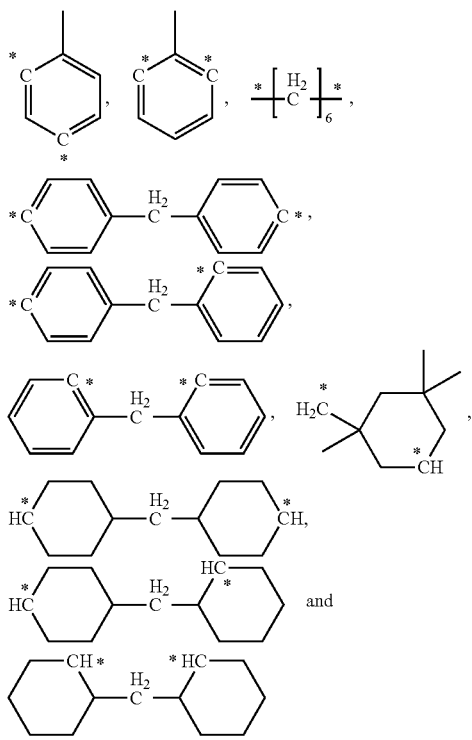

IC3 is identical or different and is selected from the group consisting of methyl, ethyl, phenyl, benzyl, cyclohexyl, and stearyl, RP1 and RP2 are each identical or different and are selected from the group consisting of branched or unbranched C1 to C18 alkyl, oleyl, benzyl, allyl, polyether radical optionally containing structural units of ethylene oxide, propylene oxide, butylene oxide or mixtures thereof, and polyester radical containing structural units of epsilon-caprolactone, delta-valerolactone or mixtures thereof, RP3 is identical or different and is selected from the group consisting of linear or branched C1 to C18 alkylene, linear or branched C2 to C18 alkenylene, polyether optionally containing structural units of ethylene oxide, propylene oxide, butylene oxide or mixtures thereof and having 1 to 25 ether oxygen atoms.

16. The composition as claimed in claim 1, characterized in that 70-100 wt % of the urea compound (B) in each case is prepared by reaction of monofunctional amines with isocyanates oligomerized by isocyanurate formation or uretdione formation, or by isocyanurate formation and uretdione formation.

17. The composition as claimed in claim 1, characterized in that 95-100 wt % of the urea compound (B) contains in each case at least one molecule segment of the general formula (IVa)

$$—O—CO—NH—Y_1—NH—CO—NH— \quad (IVa)$$

where
$Y_1$ is identical or different and is represented by a saturated or unsaturated, branched or unbranched hydrocarbon radical containing 6 to 20 carbon atoms,
and in each case contains no molecule segment of the general formula (IVb)

$$—O—CO—NH—Y_2—NH—CO—O— \quad (IVb)$$

where
Y2 is identical or different and is represented by a saturated or unsaturated, branched or unbranched hydrocarbon radical containing 6 to 20 carbon atoms.

18. The composition as claimed in claim 1, comprising 0.5-4.0 wt % of the ionogenic compound (C), where 50-100 wt % of the ionogenic compound (C) is present in the form of lithium salt or calcium salt, optionally in the form of a chloride, acetate, nitrate, or mixtures thereof.

19. The composition as claimed in claim 1, which is suitable for rheology control or for thixotroping of liquid systems.

20. The composition as claimed in claim 1, characterized in that 50-100 wt % of the amide compound (A) is present in accordance with a general formula (I) in which none of the radicals from the group of Ra, Rb, Rc, and Rd is represented by hydrogen.

21. A method comprising adding the composition of claim 1 to a liquid mixture for rheology control or thixotroping, characterized in that the liquid mixture is present in the form of a coating, a paint or varnish, a plastics formulation, a pigment paste, a sealant formulation, cosmetics, a ceramic formulation, an adhesive formulation, an encapsulating composition, a drilling mud solution, a building material formulation, a lubricant, a filling compound, a printing ink or a liquid ink.

22. A preparation which is present in the form of a paint or varnish, a plastics formulation, a pigment paste, a sealant formulation, cosmetics, a ceramic formulation, an adhesive formulation, an encapsulating composition, a building material formulation, a lubricant, a drilling mud solution, a filling compound, a printing ink or a liquid ink and to which 0.1 to 7.5 wt % of a composition as claimed in claim 1 has been added.

* * * * *